US012754403B2

(12) United States Patent
Nakahara et al.

(10) Patent No.: US 12,754,403 B2
(45) Date of Patent: Oct. 6, 2026

(54) ZOOM LENS AND IMAGE PICKUP APPARATUS

(71) Applicant: CANON KABUSHIKI KAISHA, Tokyo (JP)

(72) Inventors: Makoto Nakahara, Tochigi (JP); Takeo Mori, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 336 days.

(21) Appl. No.: 18/402,795

(22) Filed: Jan. 3, 2024

(65) Prior Publication Data

US 2024/0241354 A1 Jul. 18, 2024

(30) Foreign Application Priority Data

Jan. 16, 2023 (JP) ................................ 2023-004535

(51) Int. Cl.
*G02B 15/14* (2006.01)
*G02B 15/16* (2006.01)
*G02B 27/64* (2006.01)

(52) U.S. Cl.
CPC ......... *G02B 15/1425* (2019.08); *G02B 15/16* (2013.01); *G02B 27/646* (2013.01)

(58) Field of Classification Search
None
See application file for complete search history.

(56) References Cited

U.S. PATENT DOCUMENTS 9,219,864 B2 12/2015 Nakahara
9,377,606 B2 6/2016 Nakahara
9,500,842 B2 11/2016 Nakahara
9,829,681 B2 11/2017 Mori
10,268,104 B2 4/2019 Nakahara
10,670,832 B2 6/2020 Mori
10,718,929 B2 7/2020 Nakahara
10,754,131 B2 8/2020 Nakahara
(Continued)

FOREIGN PATENT DOCUMENTS

JP 2012-141598 A 7/2012
JP 2012-189840 A 10/2012
(Continued)

OTHER PUBLICATIONS

Notice of Reasons for Refusal issued by the Japanese Patent Office on Nov. 26, 2024 in corresponding JP Patent Application No. 2023-004535, with English translation.
(Continued)

*Primary Examiner* — Richard H Kim
(74) *Attorney, Agent, or Firm* — Carter, DeLuca & Farrell LLP

(57) ABSTRACT

A zoom lens includes, in order from an object side to an image side, a first lens unit having negative refractive power, and a rear group including two or more lens units, and an aperture stop. The rear group includes an image stabilizing unit having negative refractive power and configured to move with a component in a direction orthogonal to an optical axis during image stabilization, and a focus unit disposed on the object side of the image stabilizing unit. A distance between adjacent lens units changes during zooming. A predetermined inequality is satisfied.

29 Claims, 23 Drawing Sheets

(56) References Cited

U.S. PATENT DOCUMENTS

| | | | | |
|---|---|---|---|---|
| 10,935,755 | B2 | 3/2021 | Nakahara | |
| 11,640,048 | B2 | 5/2023 | Mori | |
| 2014/0152887 | A1 | 6/2014 | Hagiwara | |
| 2015/0219882 | A1 * | 8/2015 | Mogi | H04N 23/69 359/686 |
| 2018/0210179 | A1 | 7/2018 | Kawamura | |
| 2018/0267280 | A1 * | 9/2018 | Shibata | G02B 15/145129 |
| 2019/0215454 | A1 * | 7/2019 | Kimura | H04N 23/6811 |
| 2021/0033835 | A1 | 2/2021 | Nakahara | |
| 2022/0214530 | A1 | 7/2022 | Nakahara | |
| 2022/0334363 | A1 | 10/2022 | Mori | |
| 2023/0213738 | A1 | 7/2023 | Nakahara | |
| 2023/0213739 | A1 | 7/2023 | Nakahara | |
| 2023/0308735 | A1 | 9/2023 | Mori | |
| 2024/0045184 | A1 | 2/2024 | Nakahara | |
| 2024/0192464 | A1 | 6/2024 | Mori | |

FOREIGN PATENT DOCUMENTS

| | | | |
|---|---|---|---|
| JP | 2018-077320 | A | 5/2018 |
| JP | 2021-036283 | A | 3/2021 |
| JP | 2022-036249 | A | 3/2022 |
| WO | 2016/031256 | A1 | 3/2016 |
| WO | 2016/121941 | A1 | 8/2016 |
| WO | 2016/121966 | A1 | 8/2016 |
| WO | 2021/117563 | A1 | 6/2021 |

OTHER PUBLICATIONS

Combined Search & Exmination Report issued by the UK Patent Office on Dec. 5, 2024 in corresponding GB Patent Application No. 2400591.0.

* cited by examiner

STARTING POINT OF ARROW: IMAGE POINT POSITION OF OBJECT IMAGE IN STATIONARY STATE
END POINT OF ARROW: IMAGE POINT POSITION OF OBJECT IMAGE WHEN ANGULAR BLUR OCCURS

STARTING POINT OF ARROW: IMAGE POINT POSITION OF OBJECT IMAGE IN STATIONARY STATE
END POINT OF ARROW: IMAGE POINT POSITION OF OBJECT IMAGE AFTER ANGULAR BLUR OCCURS AND IS CORRECTED

ZOOM LENS AND IMAGE PICKUP APPARATUS

BACKGROUND

Technical Field

One of the aspects of the embodiments relates to a zoom lens and an image pickup apparatus.

Description of Related Art

A compact, lightweight, and high optical performance optical system even with a large image stabilizing amount has been required as an imaging optical system used for an image pickup apparatus such as a digital still camera, a video camera, a broadcasting camera, or a monitoring camera. Japanese Patent Laid-open No. 2022-36249 discloses a zoom lens including, in order from an object side to an image side, a first lens unit having negative refractive power, a second lens unit having positive refractive power, and a subsequent lens unit including an image stabilizing lens unit. The image stabilizing lens unit performs optical image stabilization (OIS) that reduces (corrects) image blur caused by shake (referred to as camera shake hereinafter) of an image pickup apparatus due to manual shake or the like by moving (shifting) in a direction orthogonal to an optical axis. An image sensor configured to capture an object image formed through an imaging optical system can perform image-sensor image stabilization (IIS) that corrects image blur by shifting in the direction orthogonal to the optical axis.

In an imaging optical system using a central projection method, a moving amount of an image point on an image plane due to camera shake is different between a central part and a peripheral part on the image plane. In particular, the moving amount of an image point at the peripheral part is larger than that at the central part as the imaging optical system has a wider field of view. Thus, with a super-wide-angle zoom lens having an angle of view exceeding 100°, a large image blur amount remains at the peripheral part.

FIG. 2A illustrates the ratio and direction of the moving amount of each image point in a case where image blur in the negative X direction is generated at the central part by camera shake (angle shake). FIG. 2B illustrates the residue amount (image-point moving amount) and direction of image blur at each image point at the peripheral part in a case where image blur at the central part illustrated in FIG. 2A is corrected by IIS. As illustrated in FIG. 2A, the image-point moving amount is larger at the peripheral part than that at the central part. Thus, as illustrated in FIG. 2B, a larger image-blur residue amount remains at the peripheral part than that at the central part where image blur is excellently corrected.

In the zoom lens of Japanese Patent Laid-open No. 2022-36249, curvature of field is corrected by image stabilization, but a large image-blur residue amount occurs at the peripheral part due to difference in the image-point moving amount between the central part and the peripheral part. Furthermore, it is difficult for IIS to reduce the size of the zoom lens in a case where the outer diameter of the image stabilizing lens unit is large.

SUMMARY

A zoom lens according to one aspect of the disclosure includes, in order from an object side to an image side, a first lens unit having negative refractive power, and a rear group including two or more lens units, and an aperture stop. The rear group includes an image stabilizing unit having negative refractive power and configured to move with a component in a direction orthogonal to an optical axis during image stabilization, and a focus unit disposed on the object side of the image stabilizing unit. A distance between adjacent lens units changes during zooming. The following inequality is satisfied:

$$0.40 \leq DISw/DSPw \leq 0.80$$

where DSPw is a distance on the optical axis from the aperture stop to an image plane at a wide-angle end, and DISw is a distance on the optical axis from the aperture stop to a surface disposed closest to an object in the image stabilizing unit at the wide-angle end. An image pickup apparatus having the above zoom lens also constitutes another aspect of the disclosure.

Further features of various embodiments of the disclosure will become apparent from the following description of embodiments with reference to the attached drawings.

DESCRIPTION OF THE EMBODIMENTS

Figure 1:
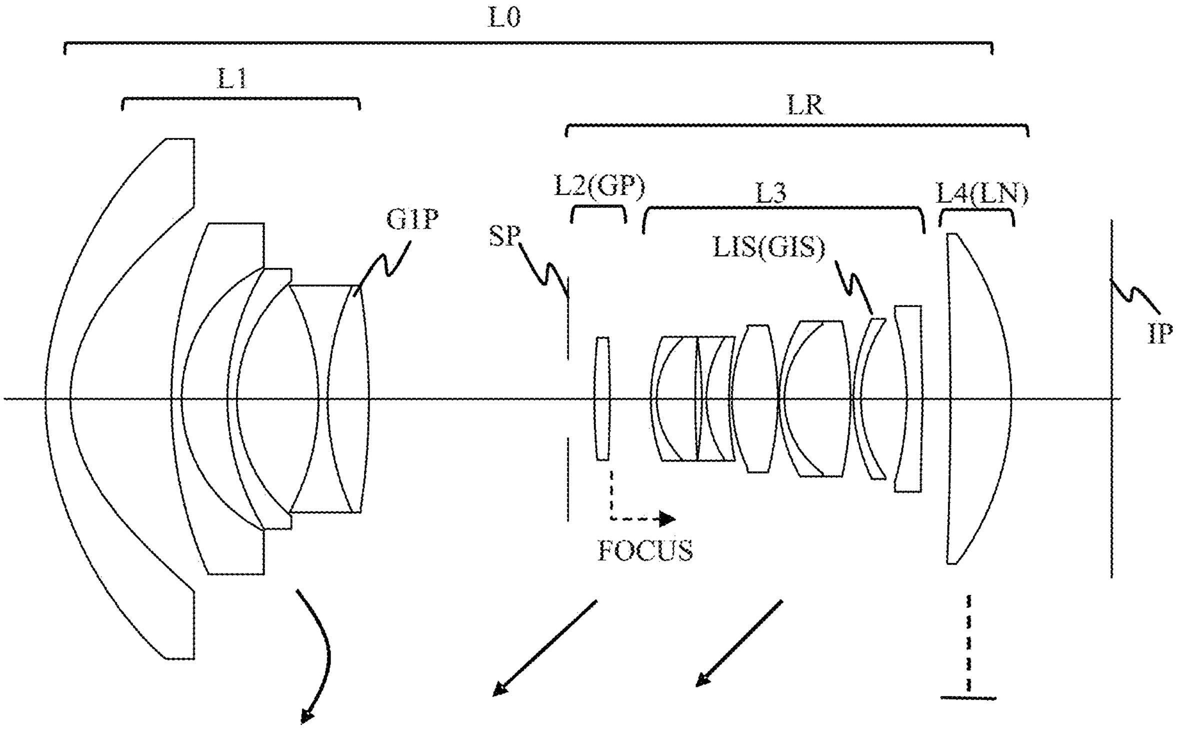
FIG. 1 is a sectional view of a zoom lens according to Example 1.
Figure 2A:
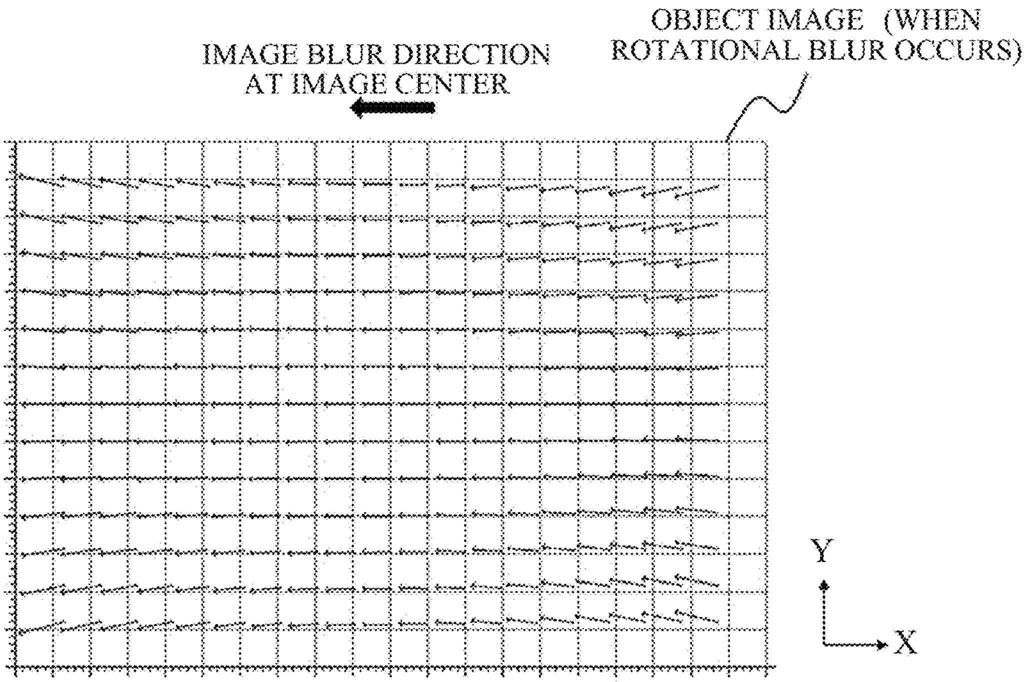
FIG. 2A illustrates a moving amount and direction of each image point in a case where image points at a central part are moved in the negative X direction due to angle shake.
Figure 2B:
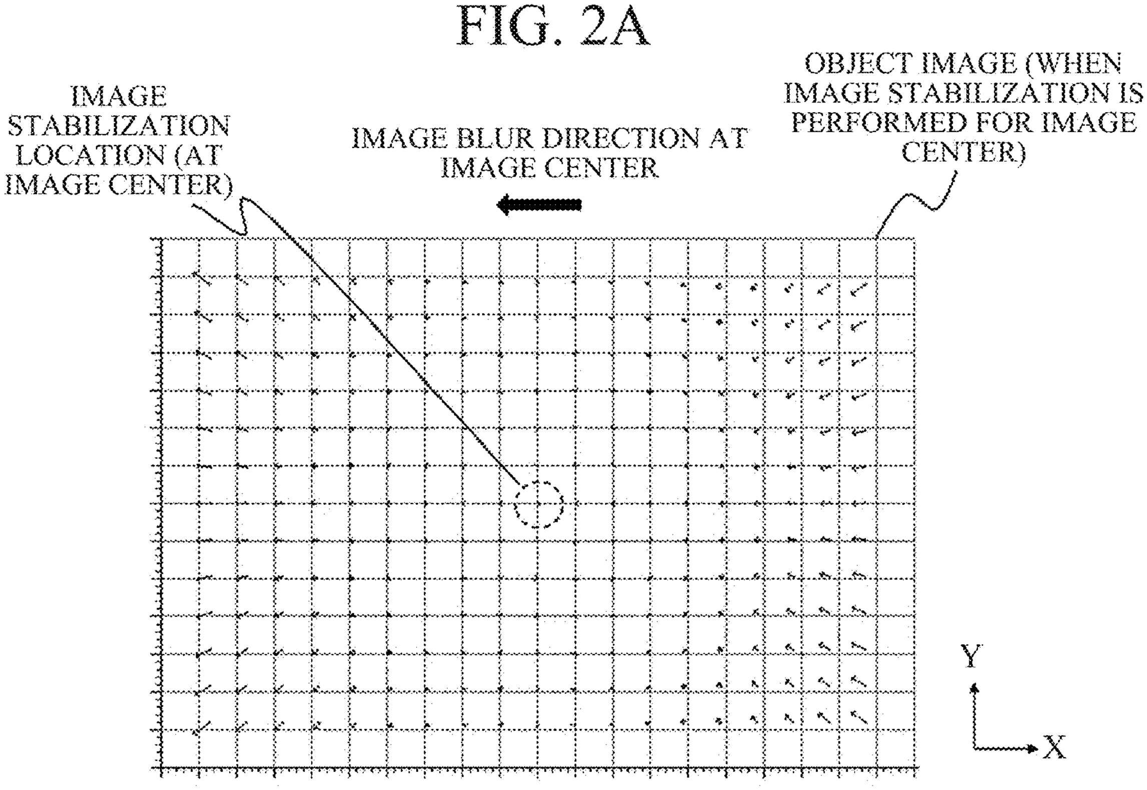
FIG. 2B illustrates an image-blur residue amount and direction in a case where image blur at the central part in FIG. 2A is corrected by OIS.
Figure 3A:
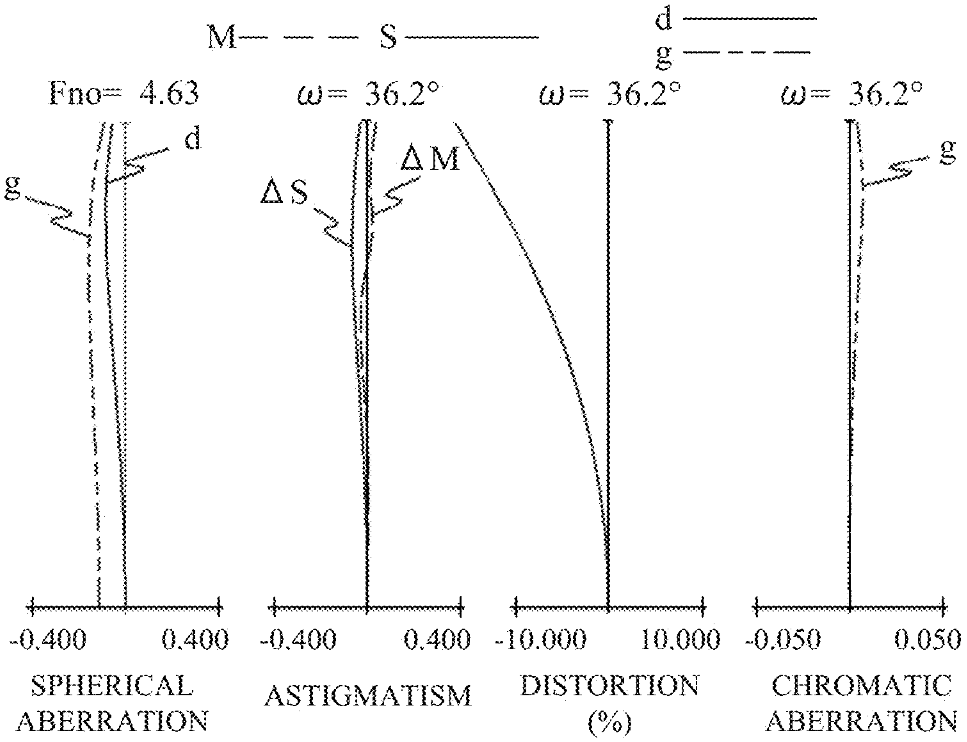
FIGS. 3A and 3B are aberration diagrams of the zoom lens according to Example 1.
Figure 3B:
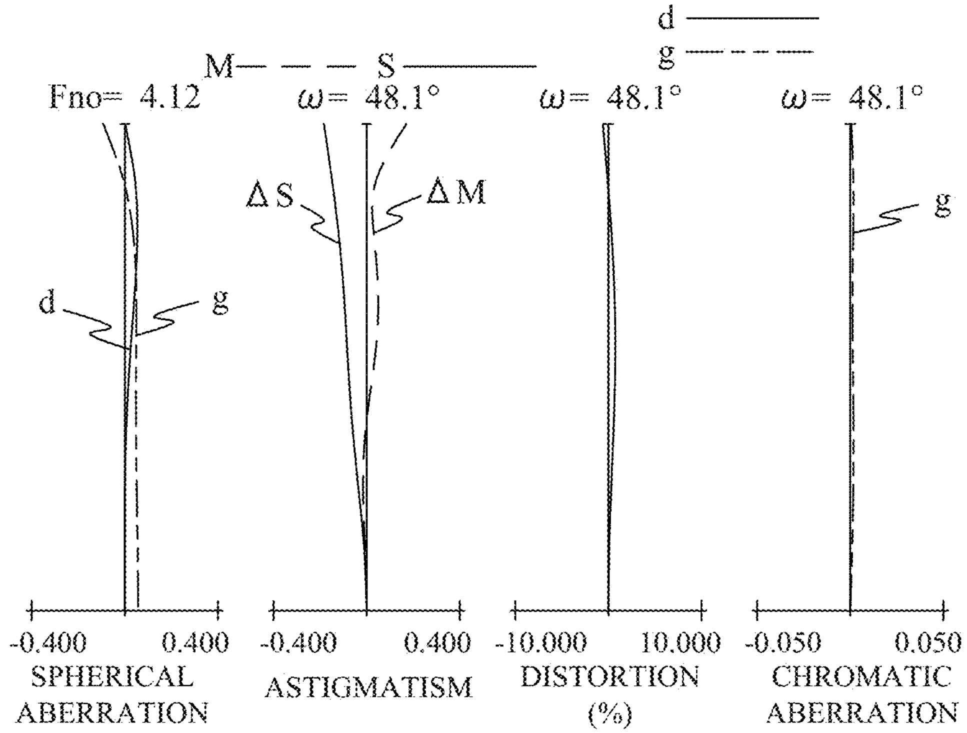
Figure 4A:
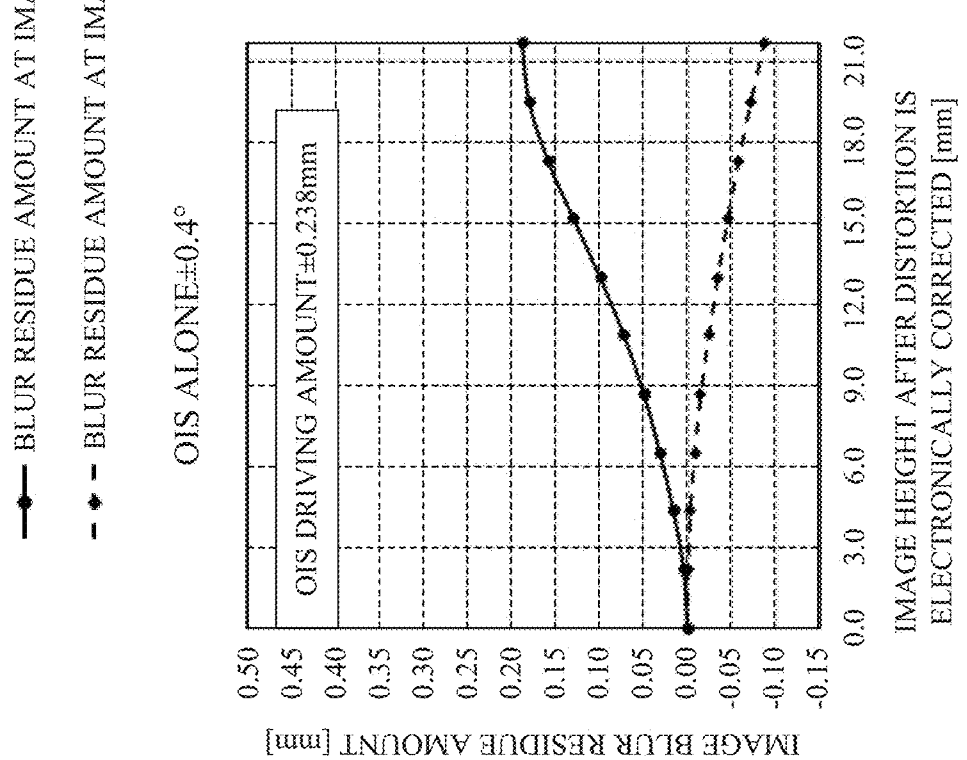
FIGS. 4A and 4B illustrate an image-blur residue amount of the zoom lens according to Example 1.
Figure 4B:
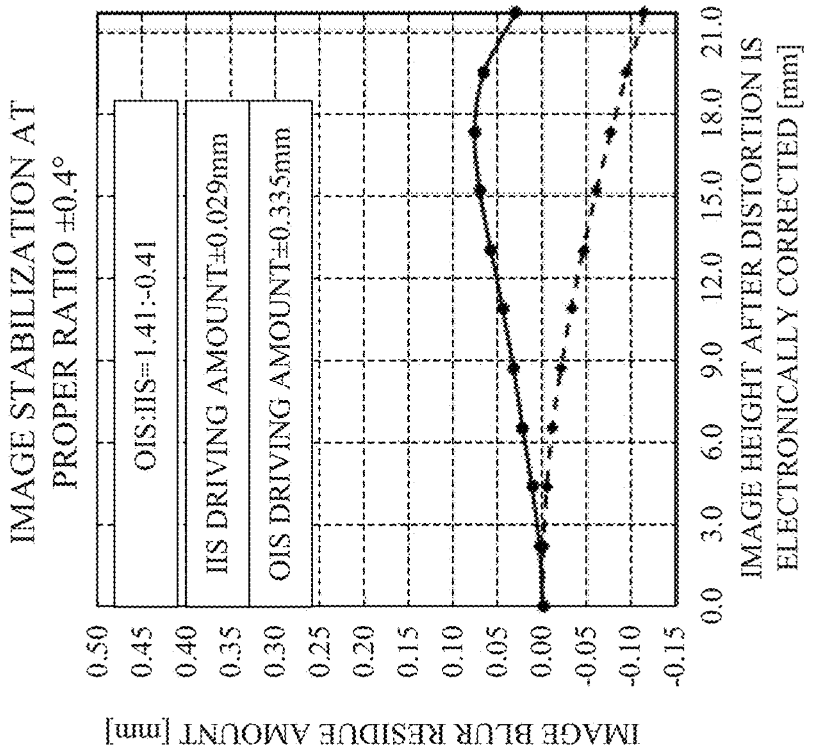
Figure 5:
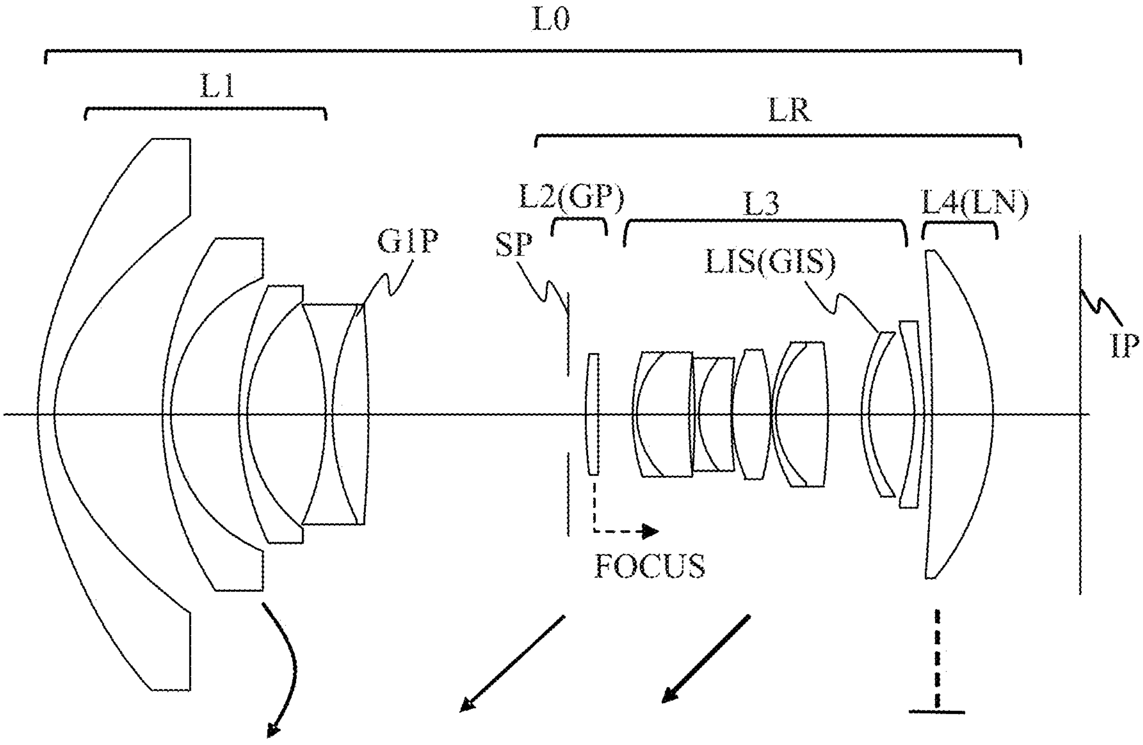
FIG. 5 is a sectional view of a zoom lens according to Example 2.
Figure 6A:
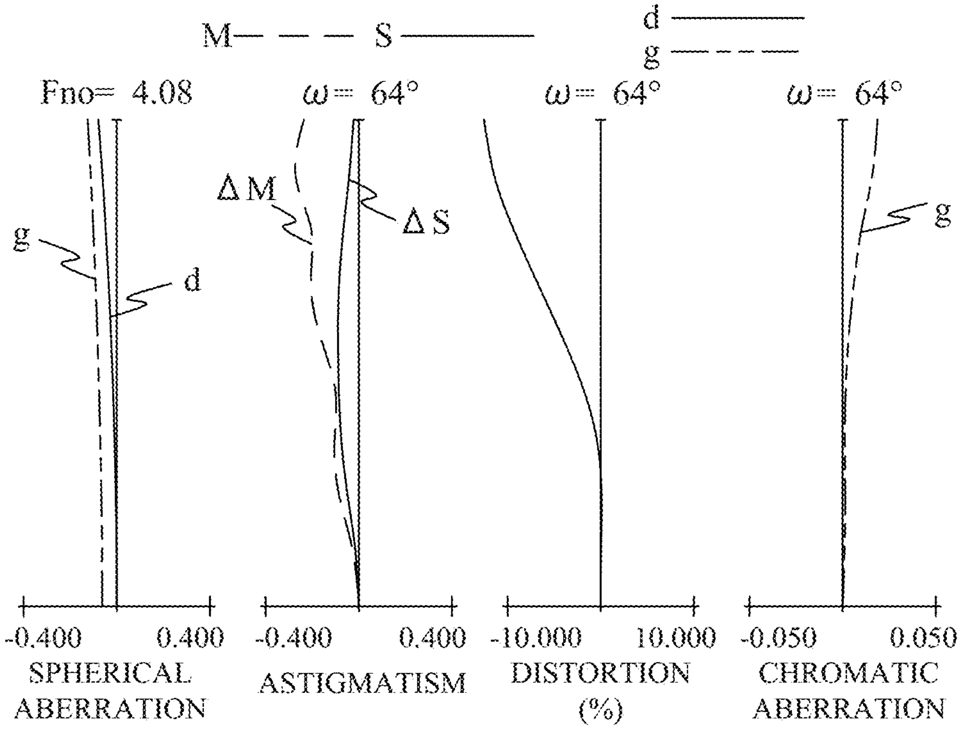
FIGS. 6A and 6B are aberration diagrams of the zoom lens according to Example 2.
Figure 6B:
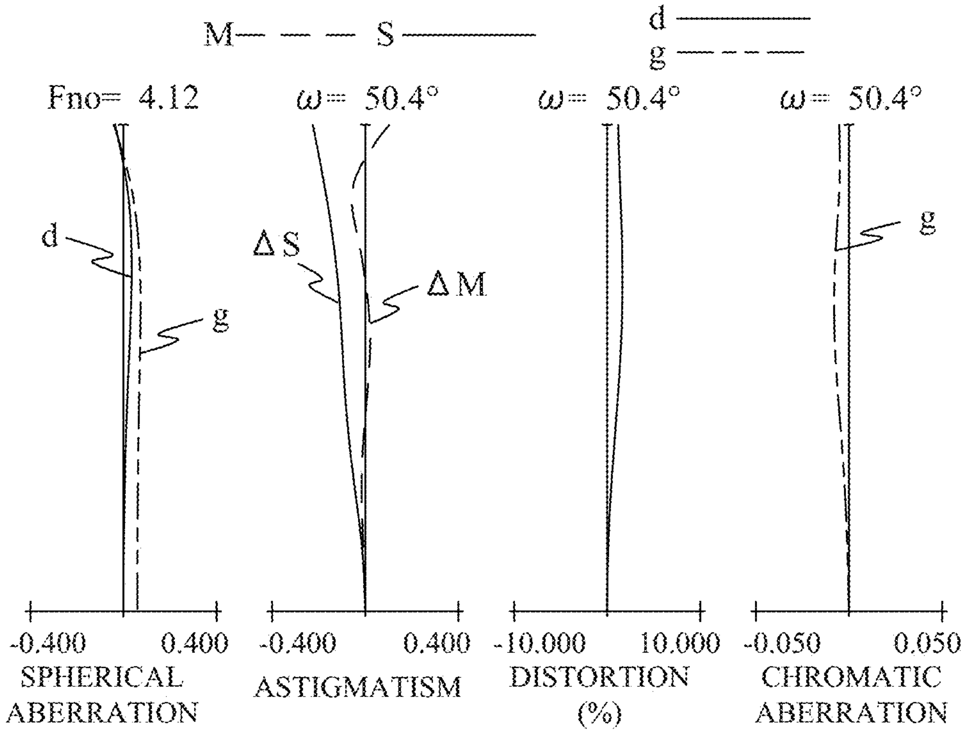
Figures 7A, 7B:
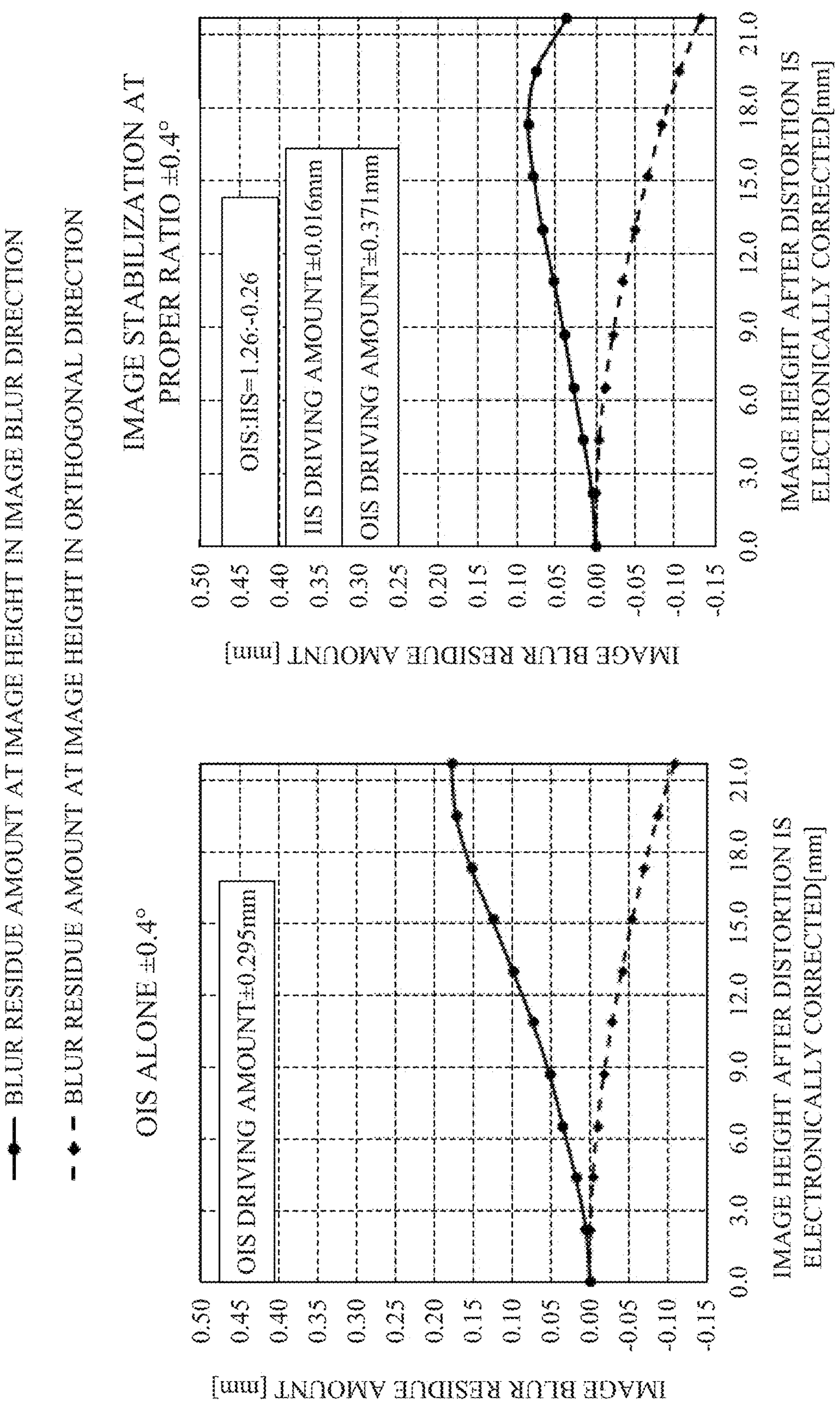
FIGS. 7A and 7B illustrate an image-blur residue amount of the zoom lens according to Example 2.
Figure 8:
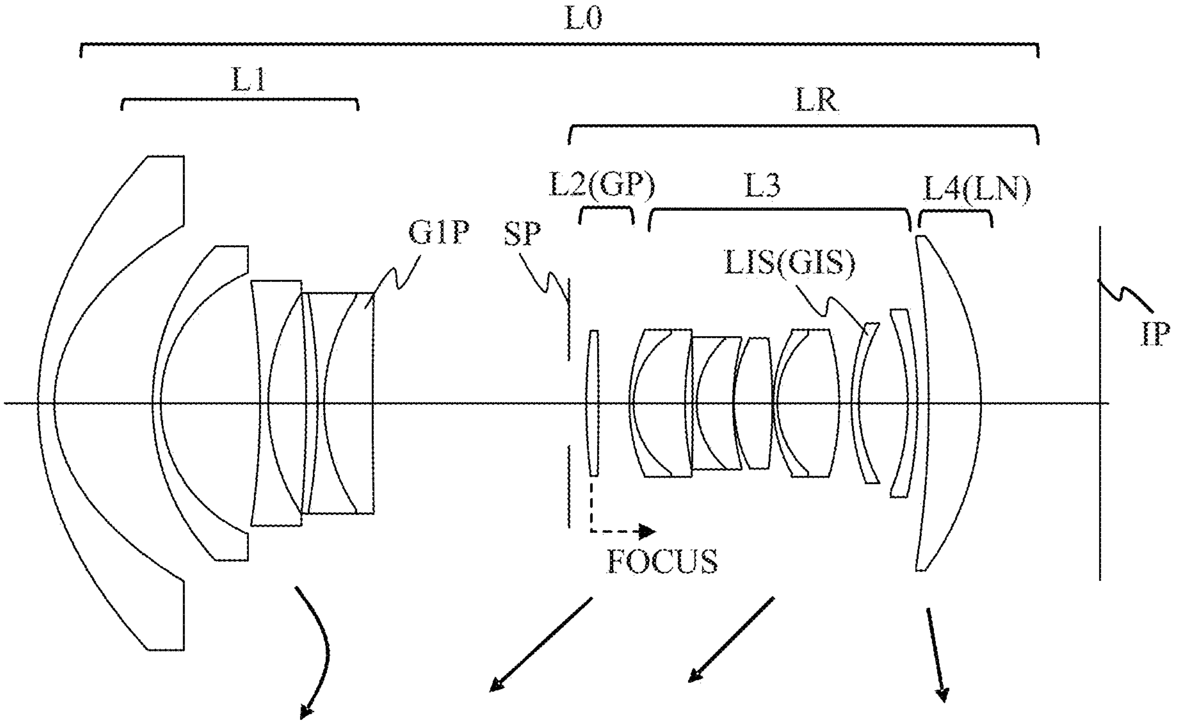
FIG. 8 is a sectional view of a zoom lens according to Example 3.
Figure 9A:
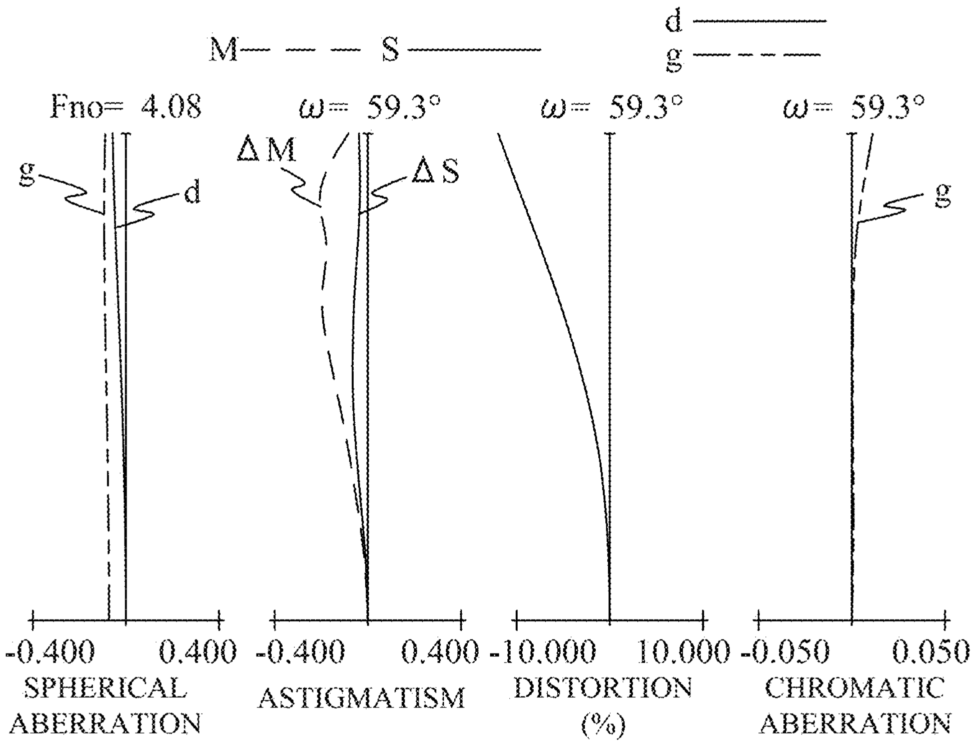
FIGS. 9A and 9B are aberration diagrams of the zoom lens according to Example 3.
Figure 9B:
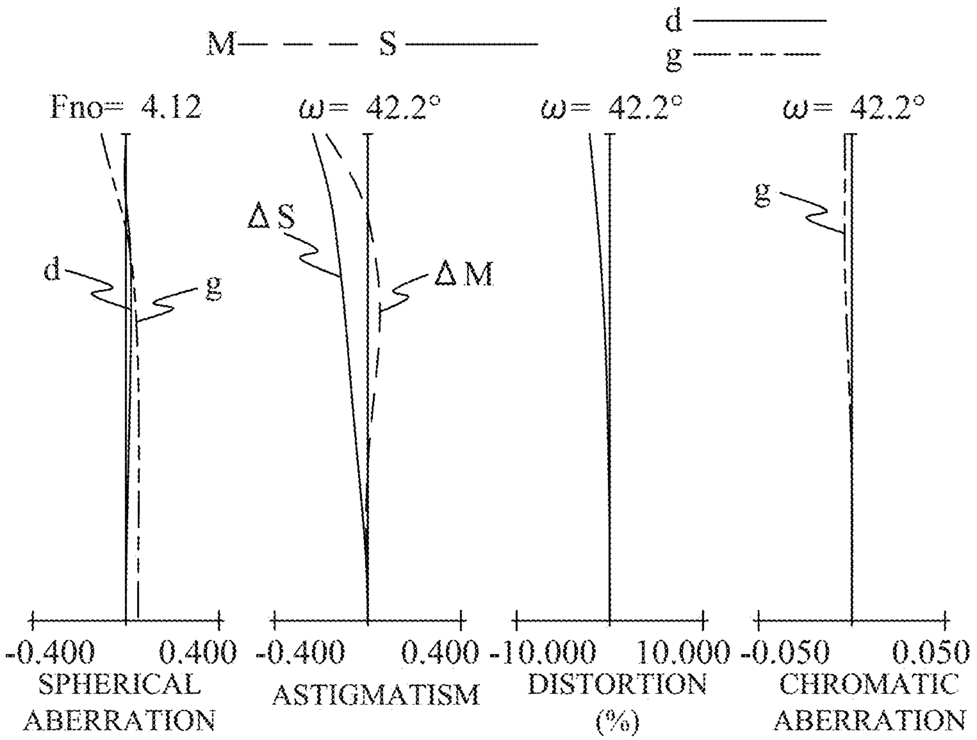
Figures 10A, 10B:
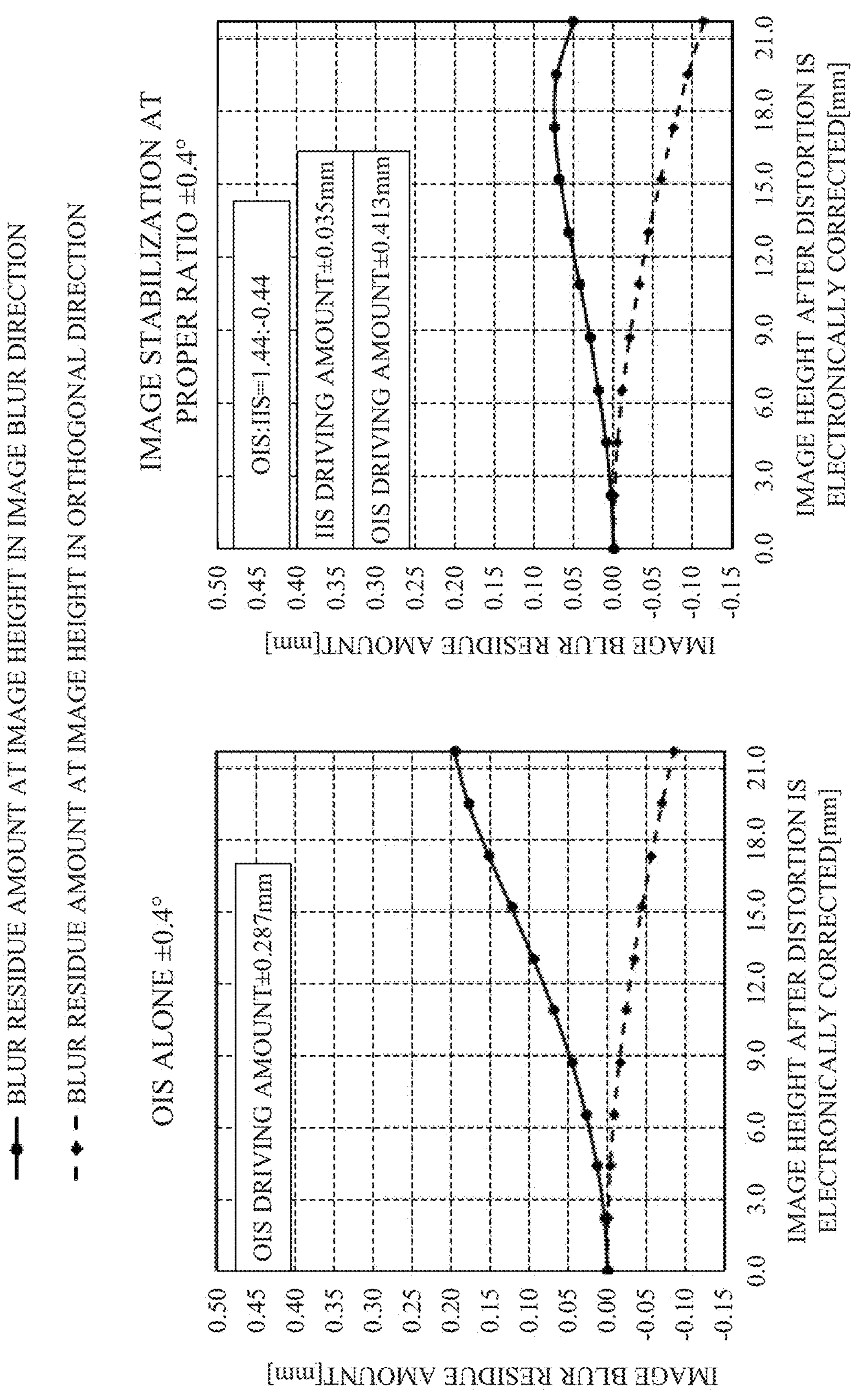
FIGS. 10A and 10B illustrate an image-blur residue amount of the zoom lens according to Example 3.
Figure 11:
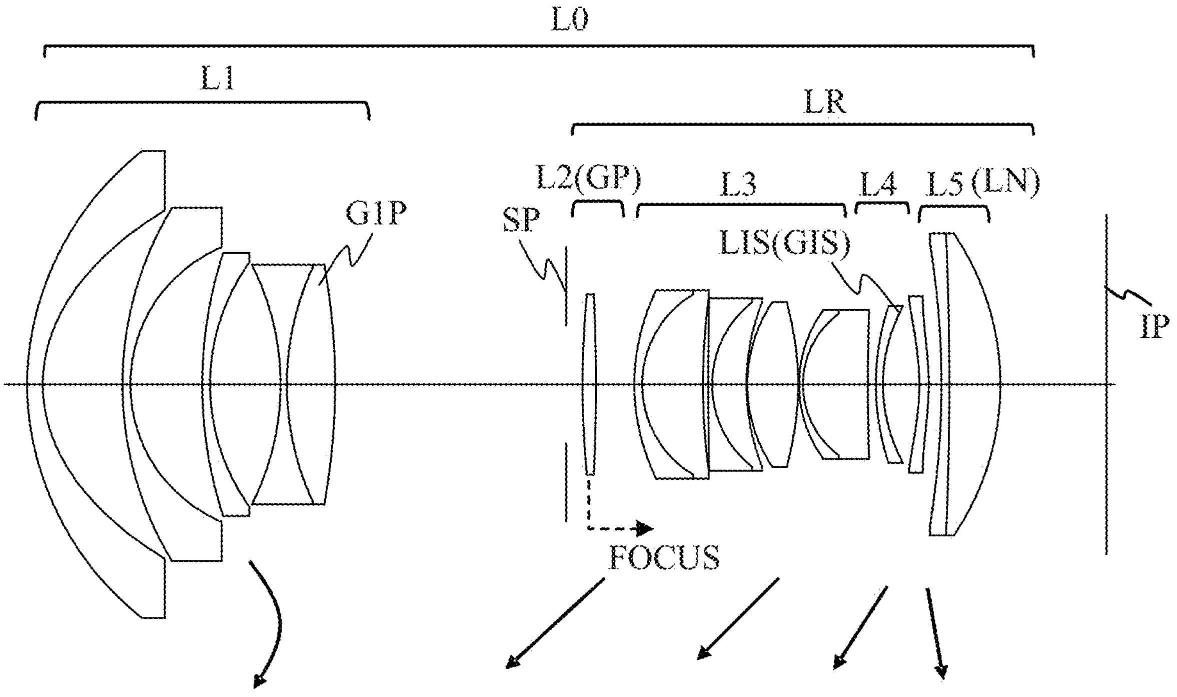
FIG. 11 is a sectional view of a zoom lens according to Example 4.
Figure 12A:
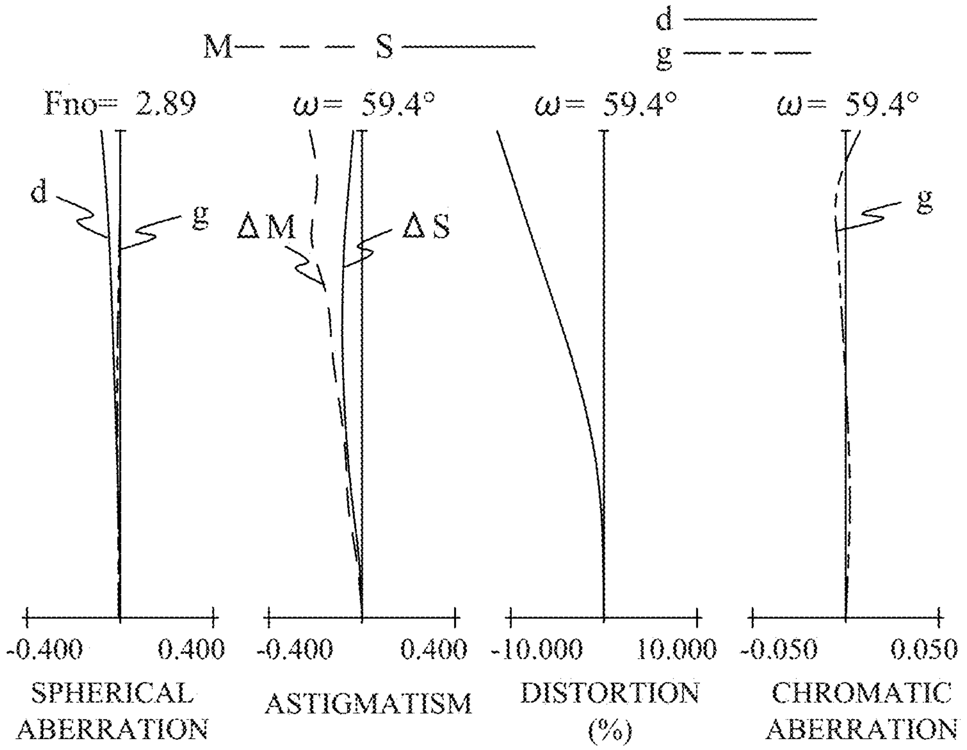
FIGS. 12A and 12B are aberration diagrams of the zoom lens according to Example 4.
Figure 12B:
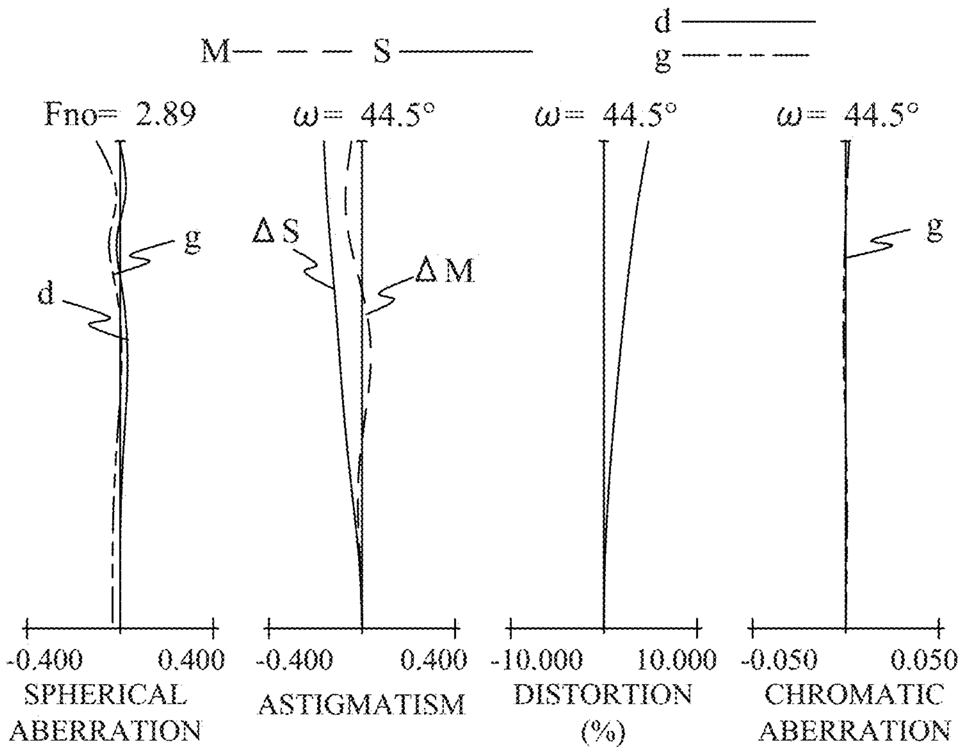
Figures 13A, 13B:
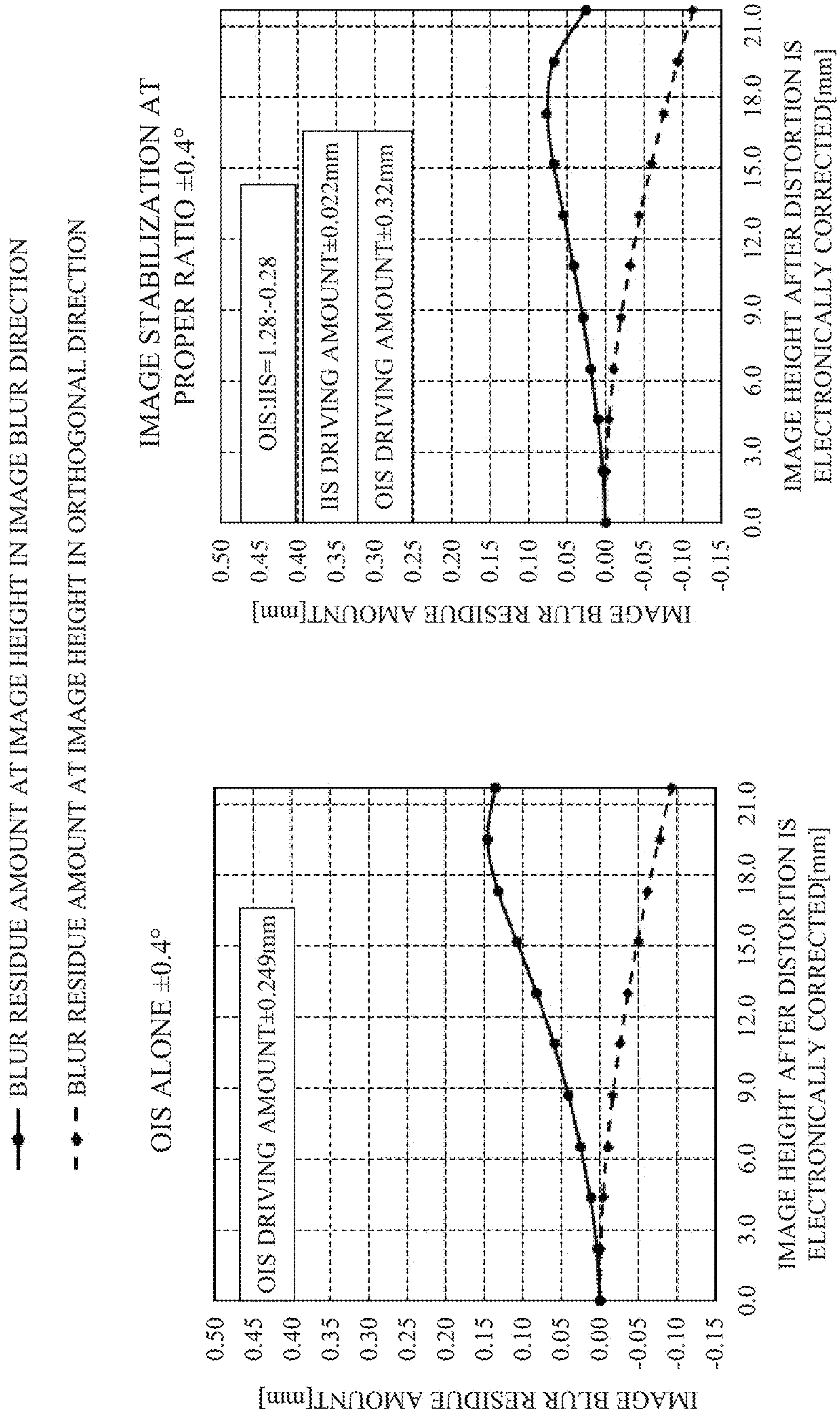
FIGS. 13A and 13B illustrate an image-blur residue amount of the zoom lens according to Example 4.
Figure 14:
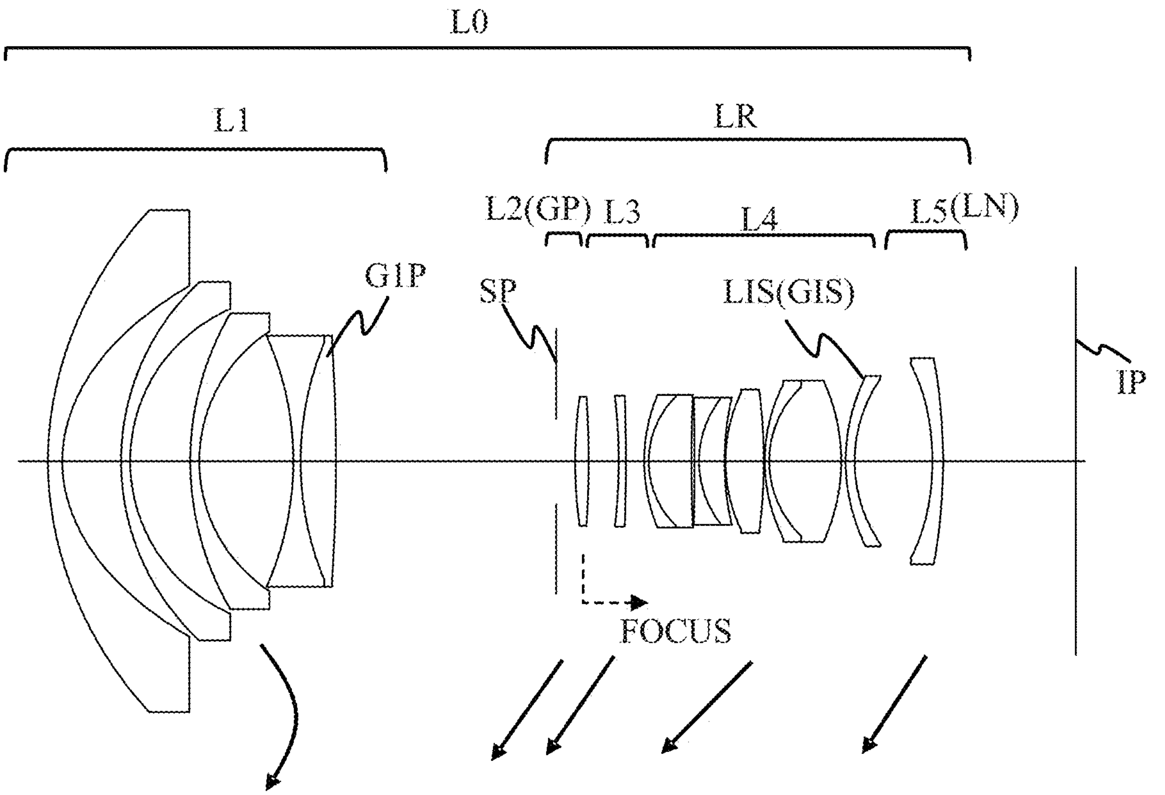
FIG. 14 is a sectional view of a zoom lens according to Example 5.
Figure 15A:
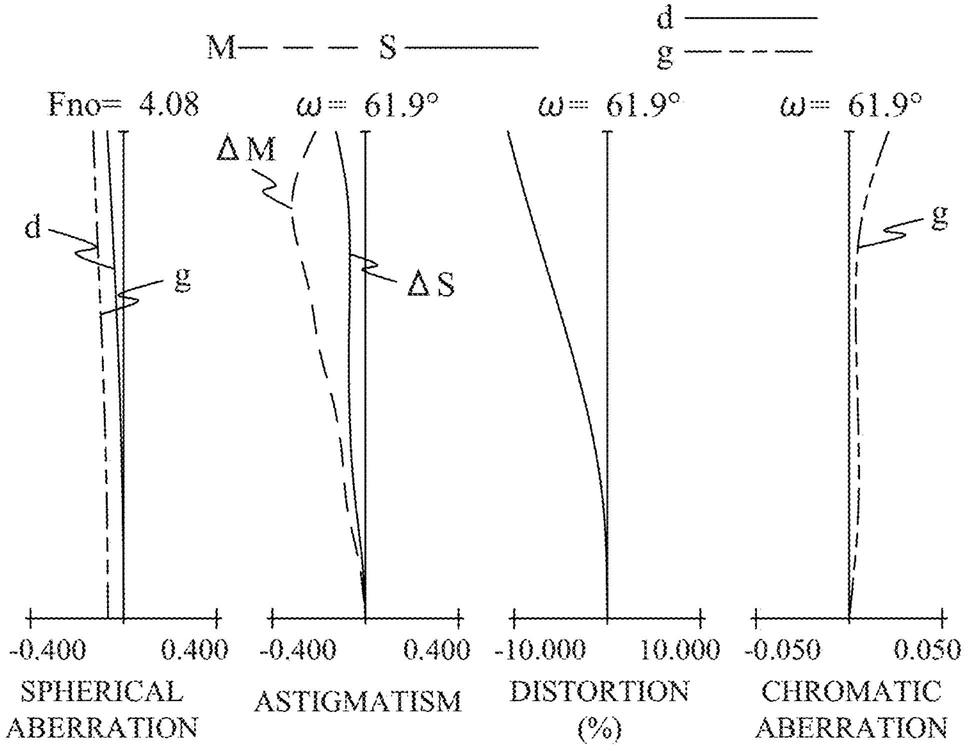
FIGS. 15A and 15B are aberration diagrams of the zoom lens according to Example 5.
Figure 15B:
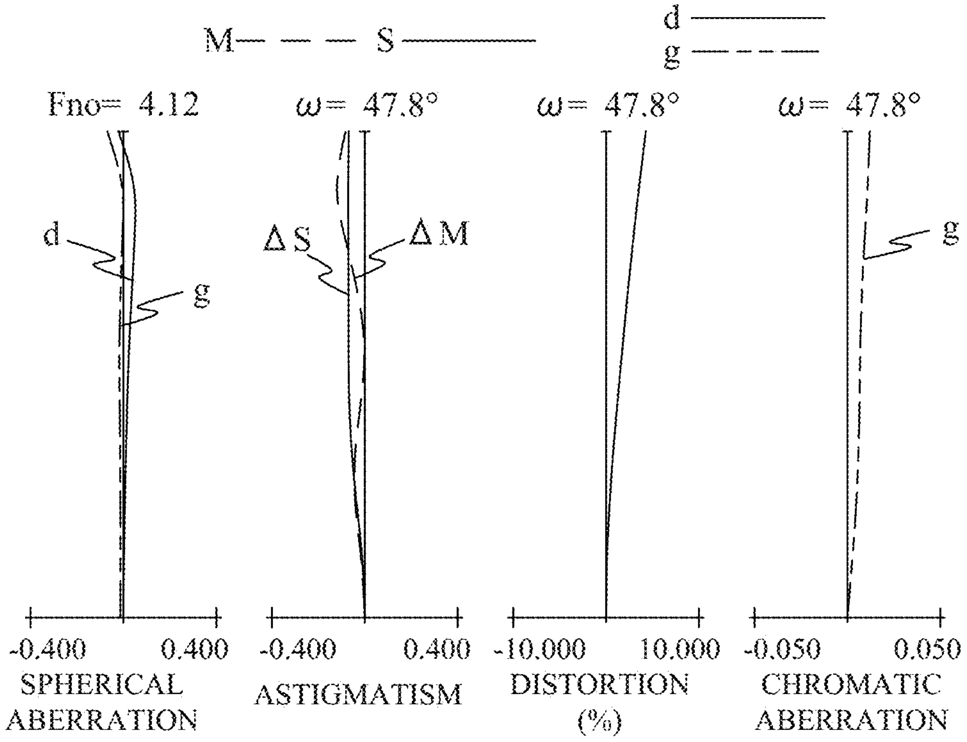
Figures 16A, 16B:
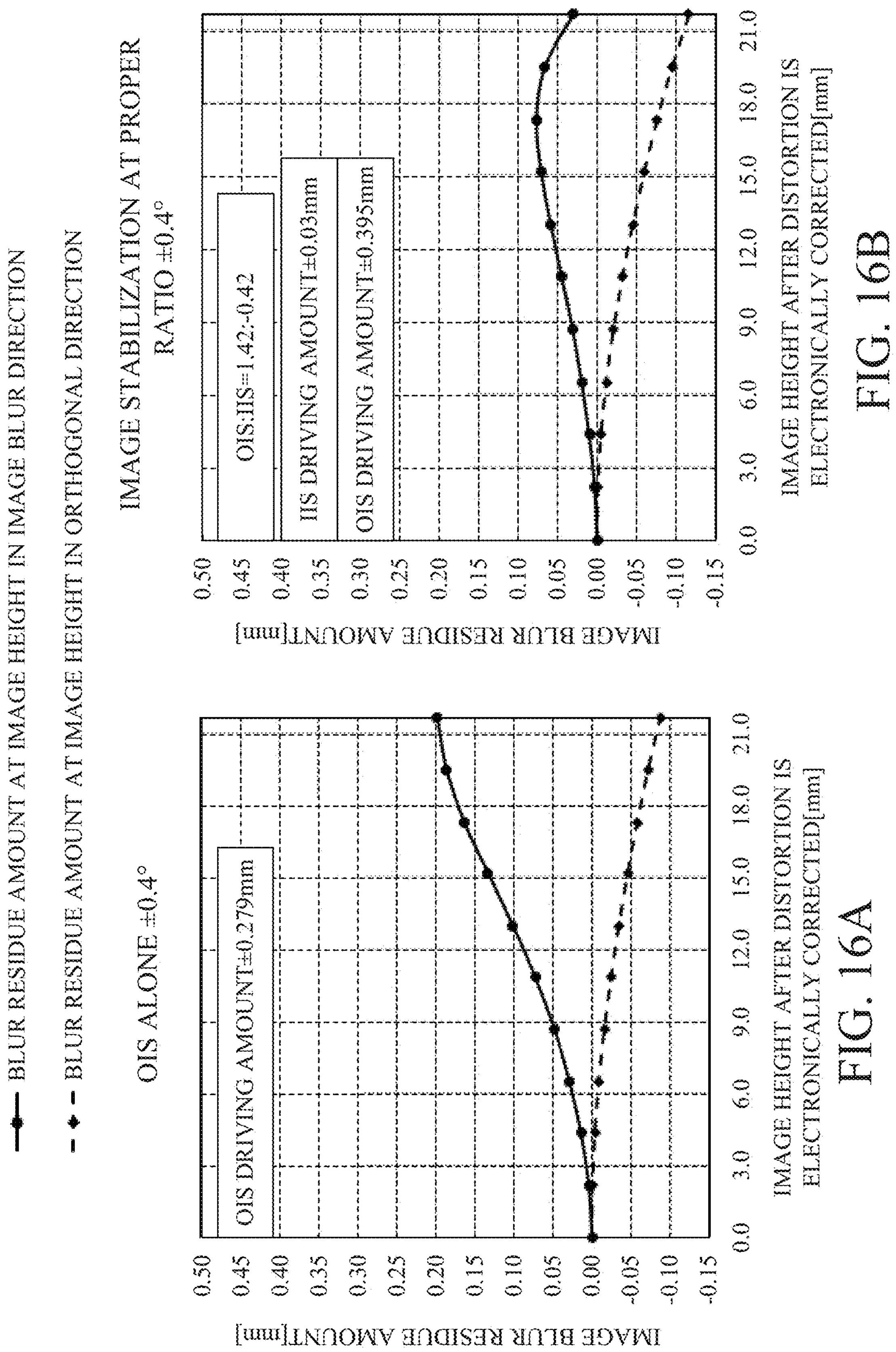
FIGS. 16A and 16B illustrate an image-blur residue amount of the zoom lens according to Example 5.
Figure 17:
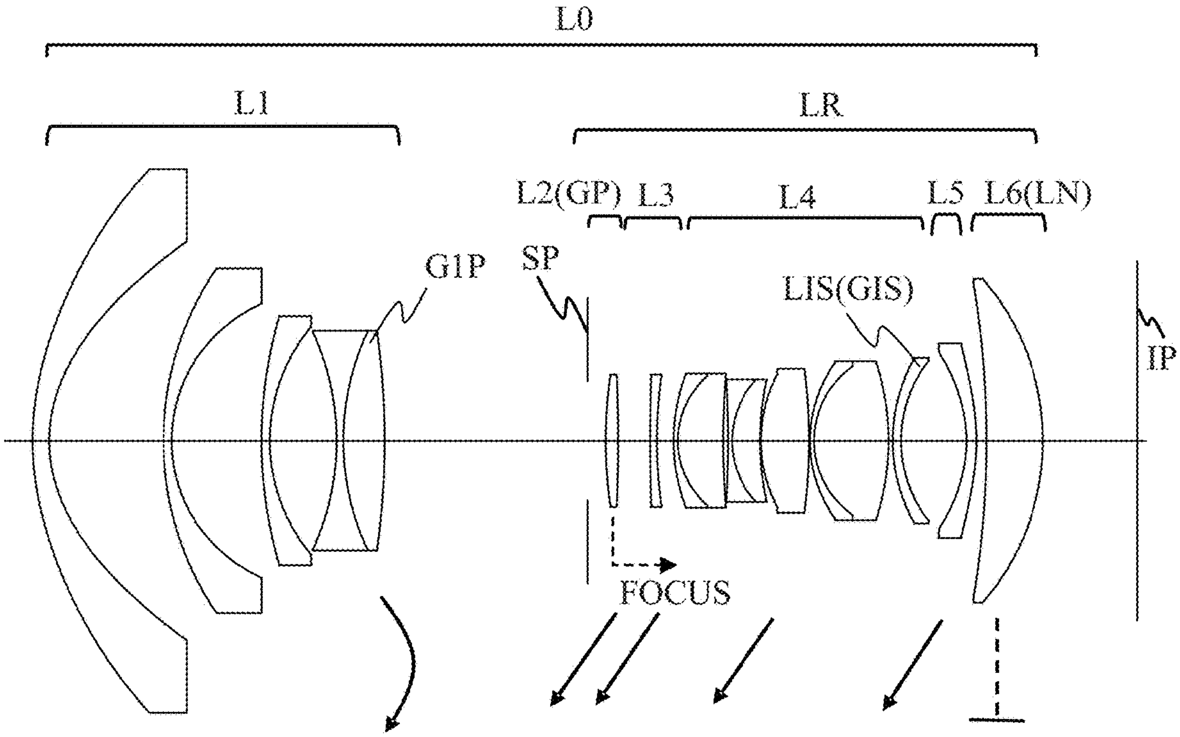
FIG. 17 is a sectional view of a zoom lens according to Example 6.
Figure 18A:
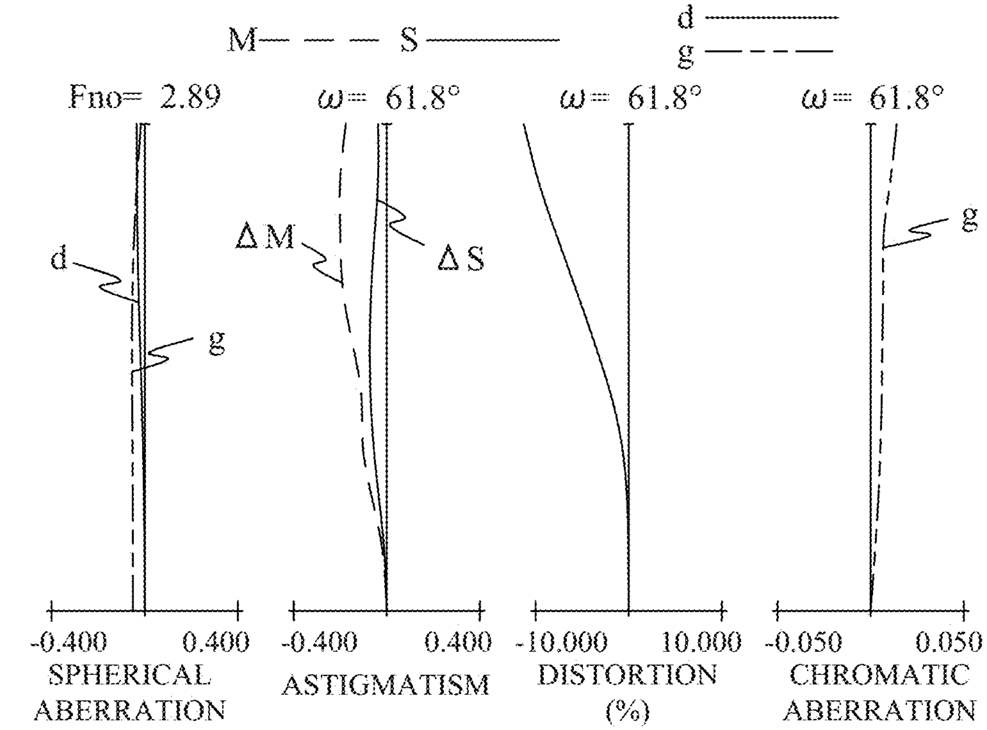
FIGS. 18A and 18B are aberration diagrams of the zoom lens according to Example 6.
Figure 18B:
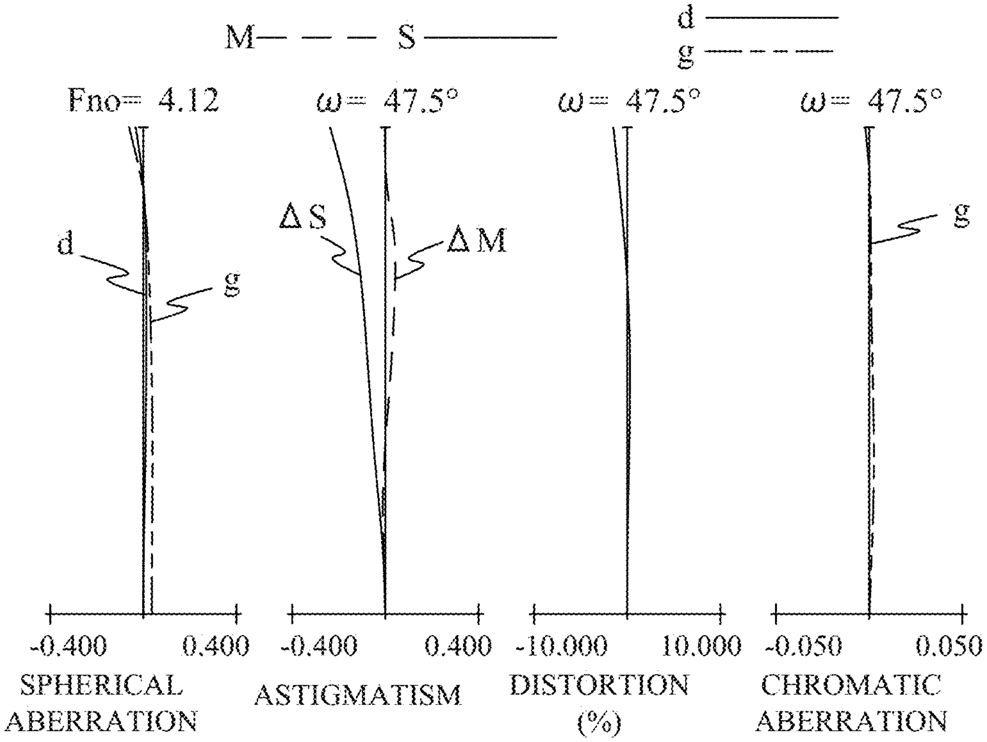
Figures 19A, 19B:
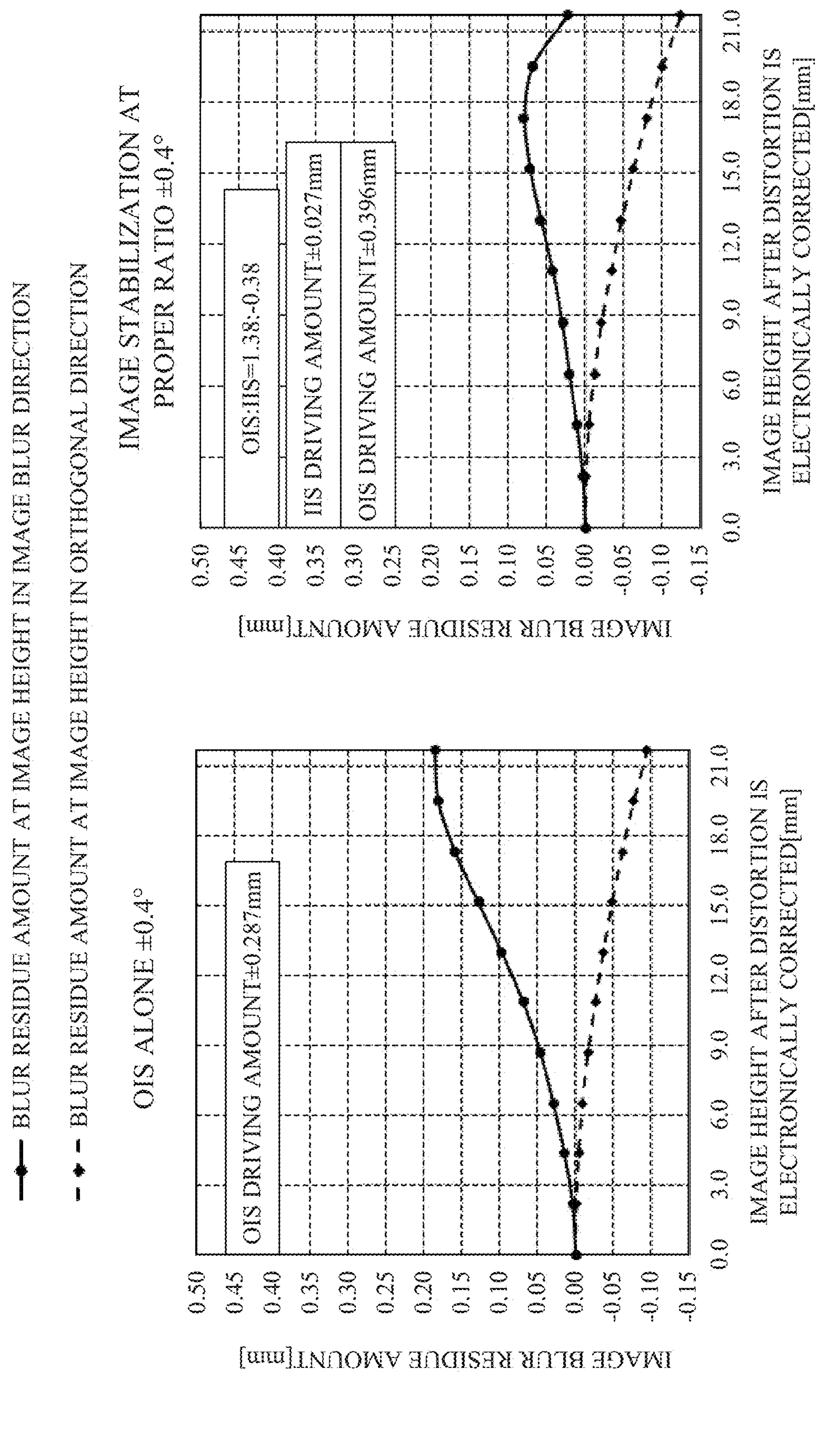
FIGS. 19A and 19B illustrate an image-blur residue amount of the zoom lens according to Example 6.
Figure 20:
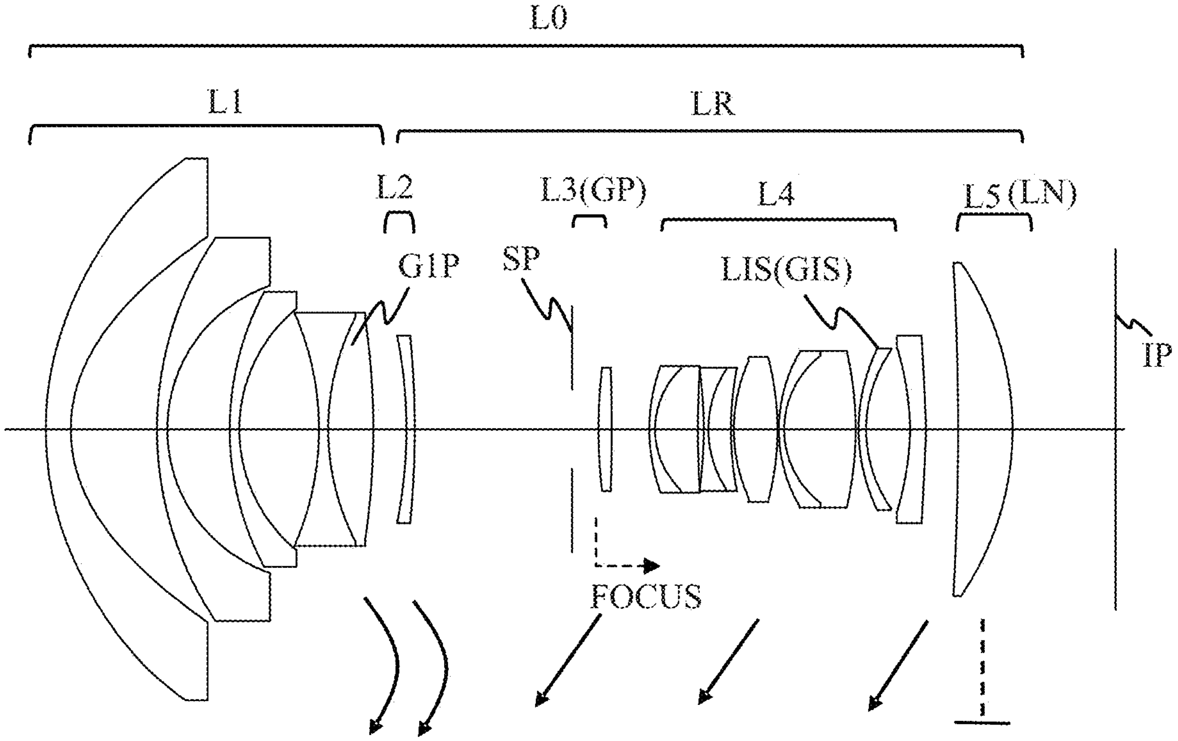
FIG. 20 is a sectional view of a zoom lens according to Example 7.
Figure 21A:
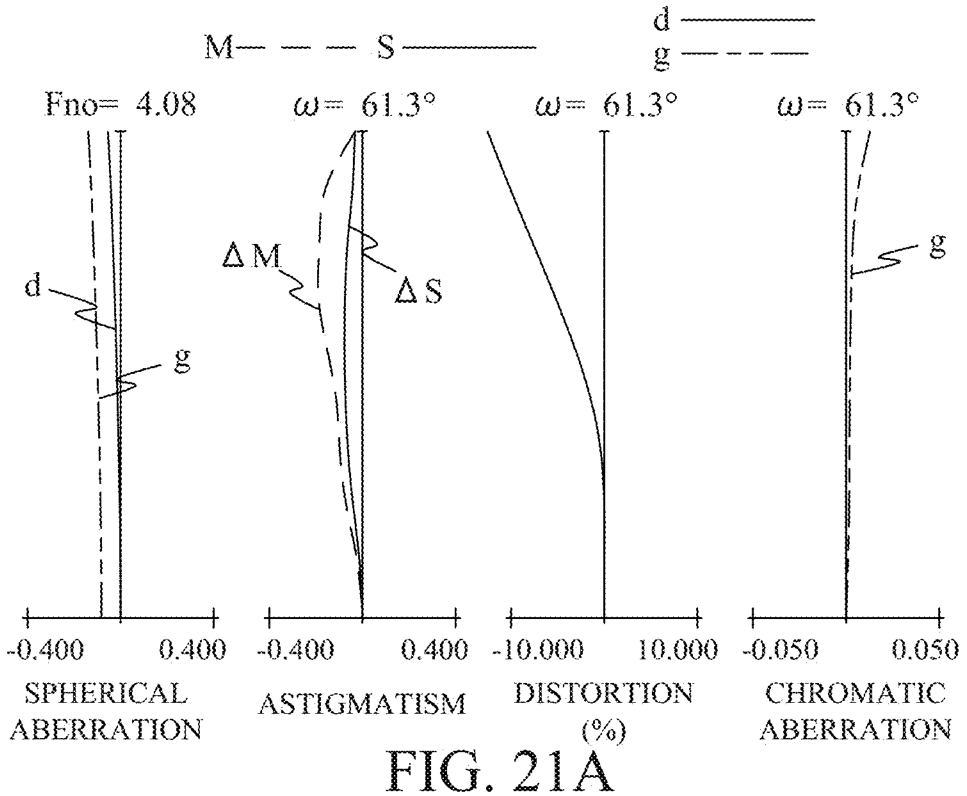
FIGS. 21A and 21B are aberration diagrams of the zoom lens according to Example 7.
Figure 21B:
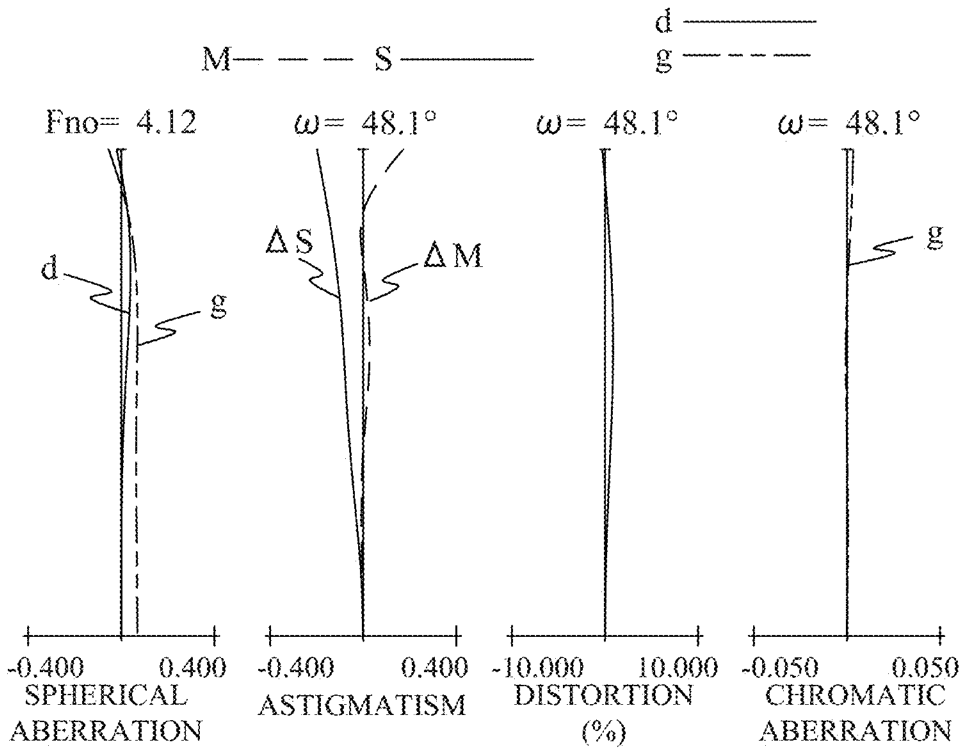
Figure 22A:
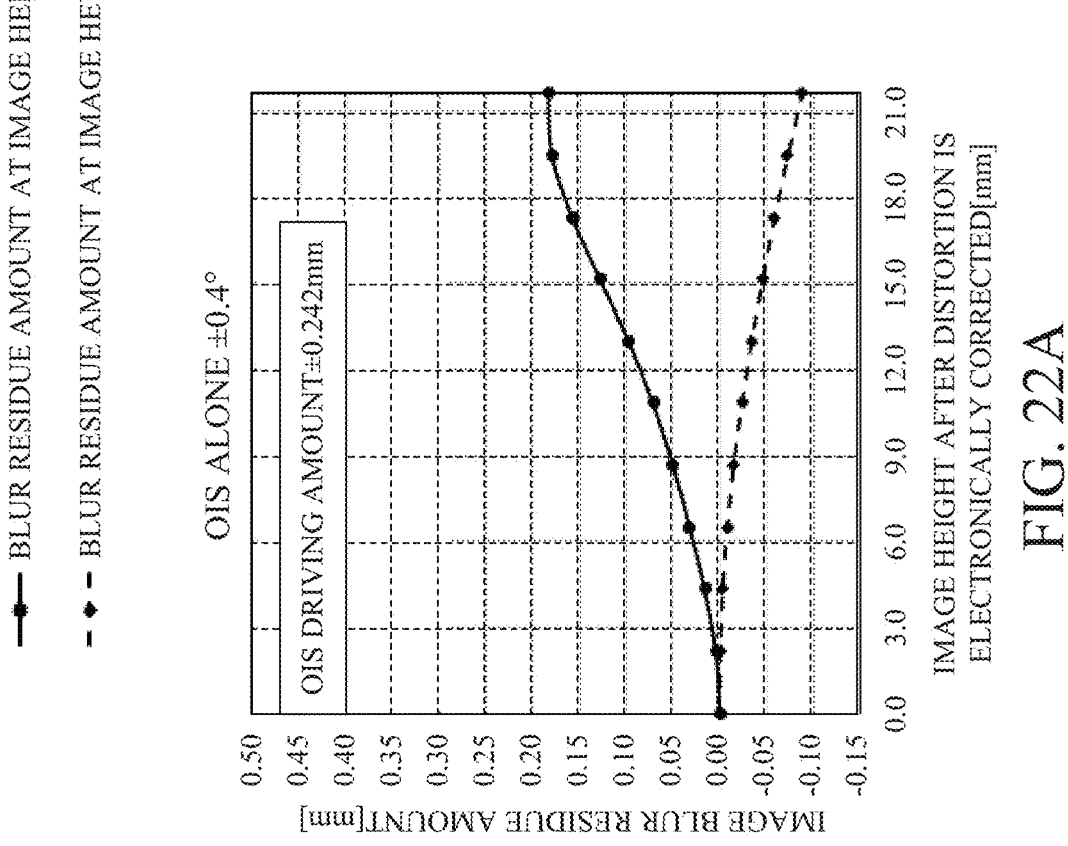
FIGS. 22A and 22B illustrate an image-blur residue amount of the zoom lens according to Example 7.
Figure 22B:
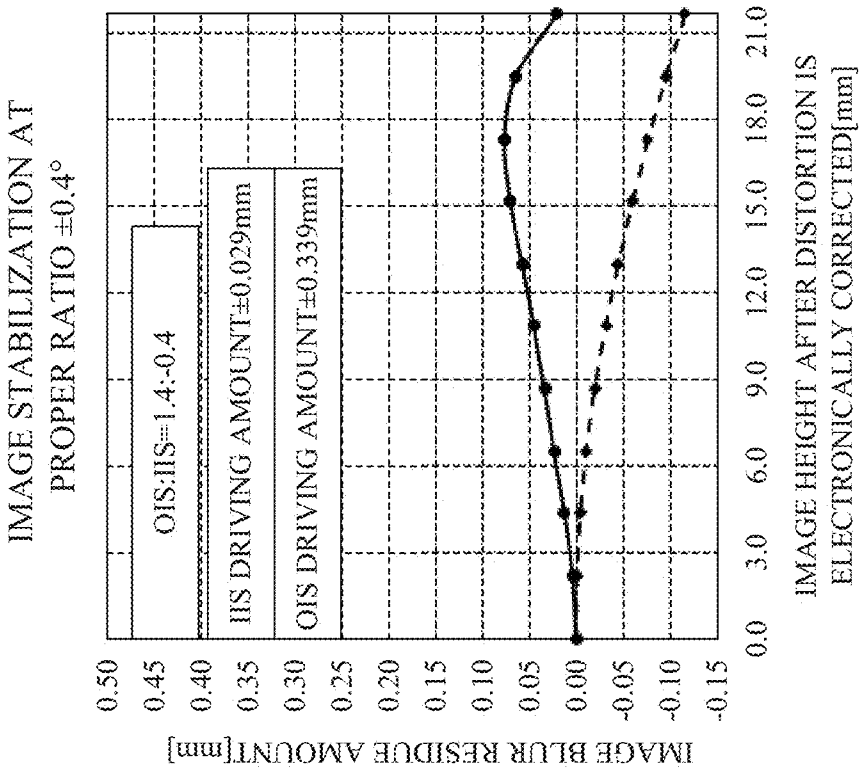

Referring now to the accompanying drawings, a description will be given of embodiments according to the disclosure.

FIGS. 1, 5, 8, 11, 14, 17, and 20 illustrate sections of zoom lenses L0 according to Examples 1 to 7, respectively, at a wide-angle end in an in-focus state at infinity. The zoom lens L0 according to each example is used for an interchangeable lens or image pickup apparatus, such as a digital video camera, a digital still camera, a film-based camera, a broadcasting camera, and a monitoring camera.

In each sectional view, a left side is an object side, and a right side is an image side. The zoom lens L0 according to each example includes a plurality of lens units. Each lens unit is a set of one or a plurality of lenses configured to integrally move during magnification variation (zooming) between a wide-angle end and a telephoto end. That is, a distance between adjacent lens units changes during zooming. The lens unit may include an aperture stop. The wide-angle end and the telephoto end indicate zoom states with a maximum angle of view (shortest focal length) and a minimum angle of view (maximum focal length), respectively, in a case where a lens unit configured to move during zooming is positioned at respective ends of a mechanically and controllably movable range on an optical axis.

In each sectional view, Li denotes an i-th (where i represents a natural number) lens unit counted from the object side among the lens units included in the zoom lens L0. LR denotes a rear group including two or more lens units and disposed on the image side of a first lens unit L1. LIS denotes an image stabilizing unit having an image stabilizing function to correct image blur by moving (shifting) in a direction orthogonal to the optical axis. The image stabilizing unit may move in a direction (for example, a rotational direction about the optical axis) including, as a component, the direction orthogonal to the optical axis.

The image stabilizing unit in each example is a set of one or more lenses in which a distance on the optical axis from a lens surface disposed closest to the object to a lens surface disposed closest to the image plane is unchanged during zooming. The image stabilizing unit may be the whole or part of a single lens unit.

In the drawings, a lens unit denoted by a broken-line arrow and "FOCUS" is a focus unit that moves from the object side to the image side during focusing from infinity to a close distance. The focus unit may be the whole of one lens unit or part of one lens unit. LN denotes a lens unit disposed closest to an image plane in the zoom lens L0.

SP denotes the aperture stop, and IP denotes the image plane. The imaging plane of a solid image sensor (photoelectric conversion element) such as a CCD sensor or a CMOS sensor, or a film plane (photosensitive surface) of a silver film is disposed on the image plane IP.

Any lens unit that moves during zooming is illustrated with a moving locus below it during zooming from the wide-angle end to the telephoto end by a solid-line arrow. Any lens unit that moves during focusing is illustrated with a moving locus below it during focusing from infinity to a close distance by a broken-line arrow.

The zoom lens L0 according to each example has a plurality of lens units that include, in order from the object side to the image side, the first lens unit L1 having negative refractive power and a rear group LR.

The first lens unit L1 includes three or more negative lenses in order from the object side, and the focus unit includes one positive lens GP.

The zoom lenses L0 according to Examples 1 and 2 each includes the first lens unit L1, a second lens unit L2 having positive refractive power, a third lens unit L3 having positive refractive power, and a fourth lens unit L4 having positive refractive power. The second lens unit L2 includes the aperture stop SP. In the zoom lenses L0 according to Examples 1 and 2, the second lens unit L2, the third lens unit L3, and the fourth lens unit L4 are included in the rear group LR. During zooming from the wide-angle end to the telephoto end, the first lens unit L1 moves along a locus that is convex on the image side, and the second lens unit L2 and the third lens unit L3 monotonically move to the object side. The fourth lens unit L4 is fixed (does not move).

The zoom lens L0 according to Example 3 includes the first lens unit L1, the second lens unit L2 having positive refractive power, the third lens unit L3 having positive refractive power, and the fourth lens unit L4 having positive refractive power. The second lens unit L2 includes the aperture stop SP. In the zoom lens L0 according to Example 3, the second lens unit L2, the third lens unit L3, and the fourth lens unit L4 are included in the rear group LR. During zooming from the wide-angle end to the telephoto end, the first lens unit L1 moves along a locus that is convex on the image side, and the second lens unit L2 and the third lens unit L3 monotonically move to the object side. The fourth lens unit L4 monotonically moves to the image side.

The zoom lens L0 according to Example 4 includes the first lens unit L1, the second lens unit L2 having positive refractive power, the third lens unit L3 having positive refractive power, the fourth lens unit L4 having negative refractive power, and a fifth lens unit L5 having positive refractive power. The second lens unit L2 includes the aperture stop SP. In the zoom lens L0 according to Example 4, the second lens unit L2, the third lens unit L3, the fourth lens unit L4, and the fifth lens unit L5 are included in the rear group LR. During zooming from the wide-angle end to the telephoto end, the first lens unit L1 moves along a locus that is convex on the image side, and the second lens unit L2, the third lens unit L3, and the fourth lens unit L4 monotonically move to the object side. The fifth lens unit L5 monotonically moves to the image side.

The zoom lens L0 according to Example 5 includes the first lens unit L1, the second lens unit L2 having positive refractive power, the third lens unit L3 having negative refractive power, the fourth lens unit L4 having positive refractive power, and the fifth lens unit L5 having negative refractive power. The second lens unit L2 includes the aperture stop SP. In the zoom lens L0 according to Example 5, the second lens unit L2, the third lens unit L3, the fourth lens unit L4, and the fifth lens unit L5 correspond to the rear group LR. During zooming from the wide-angle end to the telephoto end, the first lens unit L1 moves along a locus that is convex on the image side, and the second lens unit L2, the third lens unit L3, the fourth lens unit L4, and the fifth lens unit L5 monotonically move to the object side.

The zoom lens L0 according to Example 6 includes the first lens unit L1, the second lens unit L2 having positive refractive power, the third lens unit L3 having negative refractive power, the fourth lens unit L4 having positive refractive power, the fifth lens unit L5 having negative refractive power, and a sixth lens unit L6 having positive refractive power. The second lens unit L2 includes the aperture stop SP. In the zoom lens L0 according to Example 6, the second lens unit L2, the third lens unit L3, the fourth lens unit L4, the fifth lens unit L5, and the sixth lens unit L6 are included in the rear group LR. During zooming from the wide-angle end to the telephoto end, the first lens unit L1 moves along a locus that is convex on the image side, and the second lens unit L2, the third lens unit L3, the fourth lens unit L4, and the fifth lens unit L5 monotonically move to the object side. The sixth lens unit L6 is fixed.

The zoom lens L0 according to Example 7 includes the first lens unit L1, the second lens unit L2 having negative refractive power, the third lens unit L3 having positive refractive power, the fourth lens unit L4 having positive refractive power, and the fifth lens unit L5 having positive refractive power. The third lens unit L3 includes the aperture stop SP. In the zoom lens L0 according to Example 7, the second lens unit L2, the third lens unit L3, the fourth lens unit L4, and the fifth lens unit L5 are included in the rear group LR. During zooming from the wide-angle end to the telephoto end, the first lens unit L1 and the second lens unit L2 move along a locus that is convex on the image side, and the third lens unit L3 and the fourth lens unit L4 monotonically move to the object side. The fifth lens unit L5 is fixed.

The zoom lens L0 of each according to Examples 1 to 7 is designed to allow occurrence of distortion on the premise that distortion is corrected by image processing. Thus, an imaging optical system including the zoom lens L0 has a designed distortion amount that the zoom lens L0 has. In an image pickup apparatus configured to perform imaging using the imaging optical system, an image processing unit performs provides image processing for an acquired captured image to correct the designed distortion amount. A zoom lens as a lens apparatus such as an interchangeable lens, or an image pickup apparatus may include a memory storing correction data to be used to correct distortion.

Such a zoom lens that allows occurrence of distortion needs no lens for correcting distortion, and thus the size and weight of the zoom lens can be easily reduced. In particular, the size of the first lens unit L1 can be reduced by setting the effective imaging range (effective image circle diameter) of an image sensor at the wide-angle end to be smaller than that at the telephoto end so as to correct distortion.

In the zoom lens L0 according to each example, a parallel plate having substantially no refractive power, such as a lowpass filter or an infrared cut filter may be disposed between a lens disposed closest to the image plane and the image plane IP.

FIGS. 3A and 3B, 6A and 6B, 9A and 9B, 12A and 12B, 15A and 15B, 18A and 18B, and 21A and 21B illustrate the longitudinal aberrations (spherical aberration, astigmatism, distortion, and chromatic aberration) of the zoom lens L0 according to numerical examples 1 to 7, respectively, corresponding to Examples 1 to 7 in the in-focus state at infinity. FIGS. 3A, 6A, 9A, 12A, 15A, 18A, and 21A correspond to the wide-angle end, and FIGS. 3B, 6B, 9B, 12B, 15B, 18B, and 21B correspond to the telephoto end. In each spherical aberration diagram, Fno represents the F-number. Each spherical aberration diagram illustrates spherical aberration amounts for the d-line (wavelength 587.6 nm) and the g-line (wavelength 435.8 nm). In each astigmatism diagram, $\Delta S$ represents an astigmatism amount on a sagittal image plane, and $\Delta M$ indicates an astigmatism amount on a meridional image plane. Each distortion diagram illustrates a distortion amount for the d-line. Each chromatic aberration diagram illustrates a lateral chromatic aberration amount for the g-line. @ represents a half angle of view)(° by paraxial calculation.

FIGS. 4A and 4B, 7A and 7B, 10A and 10B, 13A and 13B, 16A and 16B, 19A and 19B, and 22A and 22B illustrate an image-blur residue amount in a case where angle shake of +0.4 deg is applied to an image pickup apparatus including the zoom lenses L0 according to Examples 1 to 7, respectively, and an image sensor configured to receive an optical image formed by the zoom lens L0. Each drawing illustrates the image-blur residue amount of the zoom lens L0 at a wide-angle end in the in-focus state at infinity. FIGS. 4A, 7A, 10A, 13A, 16A, 19A, and 22A illustrate an image-blur residue amount at each image height in an image-point moving direction (image blur direction) and a direction orthogonal to it in a case where image blur at a central part on the image plane IP is corrected by OIS alone when the image pickup apparatus is tilted. FIGS. 4B, 7B, 10B, 13B, 16B, 19B, and 22B illustrate an image-blur residue amount at each image height in the image-point moving direction and the direction orthogonal to it in a case where image blur at the central part is corrected by OIS and IIS at a certain ratio when the image pickup apparatus is tilted.

A description will now be given of a characteristic configuration of the zoom lens L0 according to each example. The zoom lens L0 according to each example is what is called a negative lead type zoom lens in which the first lens unit L1 has negative refractive power. The negative lead type zoom lens is effective for widening the field of view of a zoom lens, in particular. Since the focus unit is disposed near the aperture stop SP, the height of an off-axis ray incident on the focus unit is lowered, and thus the size of the focus unit can be easily reduced.

The image-point moving amount on the image plane along with camera shake is different between the central part and the peripheral part on the image plane, and thus image blur at the peripheral part is large for a wide-angle zoom lens. Typically, a lens unit for which an off-axis ray is high has large influence on the peripheral part on the image plane when shifted in the direction orthogonal to the optical axis. It is therefore easy to reduce image blur at the peripheral part in a case where the height of an off-axis ray incident on the image stabilizing unit is high. However, the lens diameter of the image stabilizing unit becomes large in a case where the height of an off-axis ray incident on the image stabilizing unit is high. As a result, in order to reduce the size of the image stabilizing unit and satisfactorily reduce image blur at the peripheral part, the image stabilizing unit is placed at a proper position.

Accordingly, in the zoom lens L0 according to each example, a focus unit LF is disposed near the aperture stop SP and the image stabilizing unit is properly disposed. More specifically, the zoom lens L0 according to each example satisfies the following inequality (1):

$$0.40 \leq DISw/DSPw \leq 0.80 \quad (1)$$

Inequality (1) defines a ratio of a distance DSPw on the optical axis from the aperture stop SP to the image plane to a distance DISw on the optical axis from the aperture stop SP to a surface disposed closest to the object in the image stabilizing unit LIS at the wide-angle end. Properly placing the image stabilizing unit LIS can easily reduce the diameter of the image stabilizing unit LIS and dispose driving units for driving the image stabilizing unit LIS and the focus unit. In a case where the distance from the aperture stop SP to the image stabilizing unit LIS becomes too short such that DISw/DSPw becomes lower than the lower limit of inequality (1), the height of an off-axis ray incident on the image stabilizing unit becomes lower and it becomes difficult to reduce image blur at the peripheral part. Furthermore, the distance between the focus unit LF, which is disposed near the aperture stop SP, and the image stabilizing unit LIS becomes too short, and thus it becomes difficult to dispose the driving unit for driving the focus unit LF and the image stabilizing unit LIS. In a case where the distance from the aperture stop SP to the image stabilizing unit LIS becomes too long such that DISw/DSPw becomes higher than the upper limit of inequality (1), the height of an off-axis ray incident on the image stabilizing unit LIS becomes higher. Thus, it becomes difficult to reduce the diameter of the image stabilizing unit LIS and it becomes difficult to reduce the size of the zoom lens L0.

The above configuration can provide a compact and high optical performance zoom lens.

The zoom lens L0 according to each example may satisfy at least one of the following inequalities (2) to (13):

$$25 \le vdGP \le 45 \tag{2}$$

$$0.48 \le DLFw/TLw \le 0.65 \tag{3}$$

$$0.04 \le Skw/TLw \le 0.25 \tag{4}$$

$$-0.45 \le fL1/fLF \le -0.15 \tag{5}$$

$$0.00 < |fL1/fLN| \le 0.40 \tag{6}$$

$$0.50 \le |fLN/fLIS| \le 1.60 \tag{7}$$

$$1.60 \le ndGP \le 1.91 \tag{8}$$

$$35 \le vdGIS \le 60 \tag{9}$$

$$22 \le vdG1P \le 50 \tag{10}$$

$$3.5 \le (R1+R2)/(R1-R2) \le 13.0 \tag{11}$$

$$-1.60 \le \mathrm{Ymax\_w}/fL1 \le -0.40 \tag{12}$$

$$-20.0 \le \mathrm{Dist\_w} \le -8.0 \tag{13}$$

The weight of the focus unit LF can be reduced in a case where the focus unit LF consists of a single positive lens GP. It is important to properly set a glass material of the positive lens GP to reduce chromatic aberration variation during focusing.

Inequality (2) defines an Abbe number νdGP of the positive lens GP based on the d-line. In a case where νdGP becomes lower than the lower limit of inequality (2), it becomes difficult to reduce chromatic aberration variation during focusing. In a case where νdGP becomes higher than the upper limit of inequality (2), it becomes difficult to reduce chromatic aberration variation during focusing.

The lens diameter of a zoom lens is large in a case where the height of an off-axis ray incident on a lens unit is high. Thus, in order to reduce the size and weight of the focus unit, the focus unit is disposed at a position where the height of an off-axis ray is low. The height of an off-axis ray incident on the focus unit can be lowered by placing the focus unit near the aperture stop SP.

Inequality (3) defines a ratio of an overall optical length TLw and a distance DLFw on the optical axis from a surface disposed closest to the object in the zoom lens L0 to a surface disposed closest to the object in the focus unit LF at the wide-angle end. The overall optical length is a distance on the optical axis from a lens surface disposed closest to the object in the zoom lens L0 to the image plane IP. In a case where the focus unit is positioned on the object side such that DLFw/TLw becomes lower than the lower limit of inequality (3), the height of an off-axis ray incident on the focus unit becomes higher, and thus it becomes difficult to reduce the size of the focus unit. In a case where the focus unit is positioned on the image side such that DLFw/TLw becomes higher than the upper limit of inequality (3), the height of an off-axis ray incident on the focus unit becomes higher, and thus it is difficult to reduce the size of the focus unit.

Inequality (4) defines a ratio of a back focus Skw at the wide-angle end to the overall optical length TLw at the wide-angle end. In a case where the back focus Skw becomes too short such that Skw/TLw becomes lower than the lower limit of inequality (4), it becomes difficult to dispose an optical element such as a lowpass filter near the image sensor configured to receive an optical image formed by the zoom lens L0. In a case where the back focus Skw becomes too long such that Skw/TLw becomes higher than the upper limit of inequality (4), the overall optical length of the zoom lens L0 at the wide-angle end becomes longer and the size reduction becomes difficult.

Inequality (5) defines a ratio of a focal length fL1 of the first lens unit L1 to a focal length fLF of the focus unit. In a case where the refractive power of the first lens unit L1 becomes too weak such that fL1/fLF becomes lower than the lower limit of inequality (5), it becomes difficult to achieve a wide view angle exceeding 100° at the wide-angle end. Furthermore, the diameter of the first lens unit L1 becomes large and the zoom lens becomes larger in the radial direction. In a case where the refractive power of the first lens unit L1 becomes too strong such that fL1/fLF becomes higher than the upper limit of inequality (5), the asymmetry of refractive power disposition of the zoom lens L0 becomes strong and it becomes difficult to correct distortion at the wide-angle end.

Inequality (6) defines a ratio of the focal length fL1 of the first lens unit L1 to a focal length fLN of the lens unit LN disposed closest to the image plane in the zoom lens L0. |fL1/fLN| that satisfies inequality (6) can achieve both the size reduction and high optical performance (high image quality) of the zoom lens L0. In a case where the positive refractive power of the lens unit LN becomes too strong such that |fL1/fLN| becomes lower than the lower limit of inequality (6), refractive power disposition of retrofocus becomes strong, and thus the asymmetry of refractive power disposition of the zoom lens L0 becomes strong. As a result, it becomes difficult to correct distortion at the wide-angle end or it becomes difficult to reduce the overall length at the wide-angle end. In a case where the negative refractive power of the lens unit LN becomes too strong such that |fL1/fLN| becomes higher than the upper limit of inequality (6), it becomes difficult to achieve refractive power disposition of retrofocus and it becomes difficult to widen the angle of view while securing the back focus at the wide-angle end.

Inequality (7) defines a ratio of the focal length fLN of the lens unit LN disposed closest to the image plane to a focal length fLIS of the image stabilizing unit LIS. In a case where the refractive power of the image stabilizing unit LIS becomes too weak such that |fLN/fLIS| becomes lower than the lower limit of inequality (7), the moving amount of the image stabilizing unit LIS during image stabilization becomes larger and it becomes difficult to reduce the size of the zoom lens in the radial direction. In a case where the refractive power of the image stabilizing unit LIS becomes too strong such that |fLN/fLIS| becomes higher than the upper limit of inequality (7), it becomes difficult to reduce variation in coma and curvature of field during image stabilization.

Inequality (8) defines a refractive index ndGP of the positive lens GP of the focus unit LF for the d-line. In a case where ndGP becomes lower than the lower limit of inequality (8), the curvature of the positive lens GP becomes large to provide necessary refractive power to the positive lens GP and it becomes difficult to reduce variation in various aberrations such as astigmatism during focusing. In a case where ndGP becomes higher than the upper limit of inequality (8), the curvature of the positive lens GP becomes small and it becomes difficult to reduce variation in various aberrations such as spherical aberration during focusing.

Inequality (9) defines an Abbe number νdGIS of a negative lens GIS of the image stabilizing unit for the d-line. In a case where νdGIS becomes lower than the lower limit of inequality (9), it becomes difficult to correct lateral chromatic aberration during image stabilization. In a case where νdGIS becomes higher than the upper limit of inequality (9), the refractive index of the negative lens GIS becomes small and the moving amount of the image stabilizing unit LIS during image stabilization becomes large, and thus it becomes difficult to reduce the size of the zoom lens L0 in the radial direction.

Inequality (10) defines an Abbe number νdG1P based on the d-line of the positive lens GIP having strongest refractive power among at least one positive lens included in the first lens unit L1. The refractive power is expressed by the reciprocal of the focal length. In a case where νdG1P becomes lower than the lower limit of inequality (10), it becomes difficult to correct lateral chromatic aberration during zooming. In a case where νdG1P becomes higher than the upper limit of inequality (10), it becomes difficult to correct longitudinal chromatic aberration during zooming.

Inequality (11) defines the shape of the negative lens GIS of the image stabilizing unit. The negative lens GIS has a meniscus shape with a convex surface on the object side and reduces coma variation during image stabilization. Where R1 is a radius of curvature of a lens surface on the object side of the negative lens GIS and R2 is a radius of curvature of a lens surface on the image side of the negative lens GIS, (R1+R2)/(R1−R2) represents a shape factor. In a case where (R1+R2)/(R1−R2) becomes lower than the lower limit of inequality (11), it becomes difficult to reduce variation in coma during image stabilization. In a case where (R1+R2)/(R1-R2) becomes higher than the upper limit of inequality (11), it becomes difficult to reduce variation in coma during image stabilization.

Inequality (12) defines a ratio of a maximum image height Ymax_w that is effective (imageable) to a focal length fL1 of the first lens unit L1 at the wide-angle end. The maximum image height Ymax_w is a distance from the optical axis to an image point farthest from the optical axis among imageable image points (light can be received by the image sensor), and is a maximum image height based on the magnification change due to the distortion amount. The size and weight of a lens apparatus including the zoom lens L0 can be reduced by adjusting lenses and lens moving mechanisms to the maximum image height.

In a case where the maximum image height becomes too small such that Ymax_w/fL1 becomes lower than the lower limit of inequality (12), the angle of view becomes narrower than a necessary angle of view. In a case where the maximum image height becomes too large such that Ymax_w/fL1 becomes higher than the upper limit of inequality (12), a light beam in a range larger than a necessary angle of view is imaged on the imaging plane. Therefore, the sizes of lenses and lens moving mechanisms become excessively large and it becomes difficult to reduce size and weight.

Inequality (13) defines a distortion amount Dist_w at the maximum image height Ymax_w at the wide-angle end in the in-focus state at infinity. In a case where Dist_w becomes lower than the lower limit of inequality (13), it becomes difficult to suppress image degradation at an image peripheral part at distortion correction by image processing. In a case where Dist_w becomes higher than the upper limit of inequality (13), the distortion amount in an equidistant projection scheme becomes too large, and thus degradation of peripheral image quality during image stabilization becomes larger. Furthermore, the image stabilizing amount at the peripheral part becomes insufficient in OIS.

The distortion amount Dist_w [%] at an optional image height at the wide-angle end can be expressed as follows:

$$\text{Dist\_w}\,[\%] = \left((yp - y)/y1\right) \times 100$$

where y is an ideal image height in the central projection method, and yp is a real image height.

The ideal image height y in the central projection scheme is defined as follows:

$$y = f\tan\theta i$$

where f is a focal length of the zoom lens L0, and θ is a half angle of view of an actual ray at an optional image height.

The ideal image height y can be expressed as follows:

$$y1 = f\tan\theta$$

where f is the focal length of the zoom lens L0, and θ is a half angle of view of an actual ray at the maximum image height.

Inequalities (1) to (13) may be replaced with inequalities (1a) to (13a) below:

$$0.42 \le DISw/DSPw \le 0.70 \tag{1a}$$

$$27 \le \nu dGP \le 43 \tag{2a}$$

$$0.49 \le DLFw/TLw \le 0.60 \tag{3a}$$

$$0.05 \le Skw/TLw \le 0.20 \tag{4a}$$

$$-0.40 \le fL1/fLF \le -0.17 \tag{5a}$$

$$0.00 < |fL1/fLN| \le 0.35 \tag{6a}$$

$$0.60 \le |fLN/fLIS| \le 1.50 \tag{7a}$$

$$1.63 \le ndGP \le 1.89 \tag{8a}$$

$$37 \le \nu dGIS \le 55 \tag{9a}$$

$$25 \le \nu dG1P \le 45 \tag{10a}$$

-continued $$4.0 \le (R1+R2)/(R1-R2) \le 11.0 \quad (11a)$$

$$-1.40 \le Ymax\_w/fL1 \le -0.60 \quad (12a)$$

$$-16.0 \le Dist\_w \le -9.0 \quad (13a)$$

Inequalities (1) to (13) may be replaced with inequalities (1b) to (13b) below:

$$0.45 \le DISw/DSPw \le 0.60 \quad (1b)$$

$$28 \le vdGP \le 40 \quad (2b)$$

$$0.50 \le DLFw/TLw \le 0.55 \quad (3b)$$

$$0.06 \le Skw/TLw \le 0.15 \quad (4b)$$

$$-0.38 \le fL1/fLF \le -0.20 \quad (5b)$$

$$0.00 < |fL1/fLN| \le 0.33 \quad (6b)$$

$$0.70 \le |fLN/fLIS| \le 1.40 \quad (7b)$$

$$1.65 \le ndGP \le 1.87 \quad (8b)$$

$$39 \le vdGIS \le 50 \quad (9b)$$

$$28 \le vdG1P \le 42 \quad (10b)$$

$$4.5 \le (R1+R2)/(R1-R2) \le 9.0 \quad (11b)$$

$$-1.20 \le Ymax\_w/fL1 \le -0.70 \quad (12b)$$

$$-14.0 \le Dist\_w \le -10.0 \quad (13b)$$

Next follows a description of configurations that the zoom lens according to each example may satisfy.

The first lens unit L1 includes three or more negative lenses in order from the object side. This configuration can secure a sufficiently wide angle (such as an angle of view of 100° or larger at the wide-angle end). The first lens unit L1 may include four or more negative lenses and at least one positive lens. This configuration can secure a sufficient wide angle as well as a sufficient magnification ratio (for example, about double).

The aperture stop SP may be disposed on the object side of the focus unit and monotonically move to the object side during zooming from the wide-angle end to the telephoto end. Thereby, it is easy to reduce the size of the aperture stop SP.

The rear group LR may include three or more lens units among which distances between adjacent lens units during zooming change. Thereby, a sufficient magnification ratio (for example, about double) can be achieved.

The lens unit LN disposed closest to the image plane in the zoom lens L0 may include three or fewer lenses. Thereby, the size of the zoom lens L0 can be reduced.

At the wide-angle end, the distance between the first lens unit L1 and the second lens unit L2 may be maximum among the distances between all lens units included in the zoom lens L0. Thereby, a strong retrofocus configuration is achieved at the wide-angle end, and a wide angle as well as a sufficient magnification ratio (for example, about double) can be realized.

IIS may be performed by shifting the image sensor during OIS that shifts the image stabilizing unit LIS. The combination of OIS and IIS can easily reduce image blur at the peripheral part.

Numerical examples 1 to 7 will now be described. In surface data of each numerical example, a surface number m represents the order of a surface counted from the object side. r represents a radius of curvature of an m-th surface, d (mm) represents an on-axis distance (distance on the optical axis) between m-th and (m+1)-th surfaces, nd represents a refractive index of an optical material between the m-th surface and the (m+1)-th surface for the d-line, and νd represents an Abbe number of the optical material. The Abbe number νd is expressed as follows:

$$\nu d = (Nd-1)/(NF-NC)$$

where Nd, NF, and NC are refractive indices for the d-line (587.6 nm), the F line (486.1 nm), and the C line (656.3 nm) in the Fraunhofer line.

In each numerical example, d, a focal length (mm), an F-number (Fno), and a half angle of view (°) are values when the zoom lens L0 is in the in-focus state at infinity. The back focus is an air conversion length of a distance on the optical axis from a final lens surface that is the lens surface closest to the image plane in the zoom lens to a paraxial image plane. The overall lens length is a sum of the back focus and the distance on the optical axis from a foremost lens surface as a lens surface closest to the object in the zoom lens L0 to the final lens surface.

An asterisk * is added to the right side of the surface number of an optical surface having an aspherical surface shape. An aspherical surface shape is expressed as follows:

$$X = (h^2/R)/\left[1 + \left[1-(1+K)(h/R)^2\right]^{1/2}\right] + A4\times h^4 + A6\times h^6 + A8\times h^8 + A10\times h^{10} + A12\times h^{12} + A14\times h^{14}$$

where X is a displacement amount from a surface vertex in the optical axis direction, h is a height from the optical axis in the direction orthogonal to the optical axis, R is a paraxial radius of curvature, K is a conic constant, and A4, A6, A8, A10, and A12 are aspherical surface coefficients of respective orders. In the conic constant and the aspherical surface coefficients, "e±XX" means "$\times 10^{\pm XX}$". WIDE represents the wide-angle end, MIDDLE represents an intermediate (middle) zoom position, TELE represents a telephoto end.

Numerical Example 1

UNIT: mm

SURFACE DATA

| Surface No. | r | d | nd | νd |
|---|---|---|---|---|
| 1* | 37.000 | 3.00 | 1.58313 | 59.4 |
| 2* | 17.814 | 12.20 | | |
| 3 | 52.582 | 1.23 | 1.91082 | 35.2 |
| 4 | 17.849 | 5.54 | | |
| 5 | 30.037 | 1.15 | 1.59282 | 68.6 |
| 6 | 18.728 | 9.86 | | |
| 7 | −28.561 | 1.10 | 1.43875 | 94.7 |
| 8 | 33.065 | 4.99 | 1.88300 | 40.8 |
| 9 | −88.917 | (Variable) | | |
| 10 (SP) | ∞ | (Variable) | | |
| 11 | 76.538 | 1.86 | 1.72047 | 34.7 |
| 12 | −170.686 | (Variable) | | |
| 13 | 21.263 | 0.69 | 1.80810 | 22.8 |
| 14 | 10.223 | 4.67 | 1.67300 | 38.3 |
| 15 | 101.506 | 0.80 | | |

-continued

| SURFACE DATA | | | | |
|---|---|---|---|---|
| Surface No. | r | d | nd | vd |
| 16 | −48.763 | 0.55 | 1.88300 | 40.8 |
| 17 | 13.497 | 2.73 | 1.92286 | 20.9 |
| 18 | 39.963 | 0.35 | | |
| 19 | 19.540 | 5.55 | 1.49700 | 81.5 |
| 20* | −31.043 | 0.15 | | |
| 21 | 18.566 | 0.64 | 2.05090 | 26.9 |
| 22 | 11.089 | 7.99 | 1.49700 | 81.5 |
| 23 | −43.632 | 0.35 | | |
| 24 | 22.204 | 0.90 | 1.88300 | 40.8 |
| 25 | 16.576 | 5.56 | | |
| 26* | −26.667 | 1.90 | 1.85400 | 40.4 |
| 27* | −55.445 | (Variable) | | |
| 28 | −497.495 | 7.36 | 1.49700 | 81.5 |
| 29 | −33.423 | (Variable) | | |
| Image Plane | ∞ | | | |

Aspheric Data

1st Surface $$K = 0.00000e+00\ A\ 4 = 2.59429e-06\ A\ 6 = -2.61399e-08$$
$$A\ 8 = 5.21697e-11\ A10 = -5.59197e-14\ A12 = 3.27515e-17$$
$$A14 = -8.57311e-21$$

2nd Surface $$K = -8.76022e-01\ A\ 4 - 9.21107e-06\ A\ 6 - 3.58438e-08$$
$$A\ 8 = -4.52147e-11\ A10 = 2.92832e-13\ A12 = -4.25258e-16$$
$$A14 = 2.03592e-19$$

20th Surface $$K = 0.00000e+00\ A\ 4 = 2.45229e-05\ A\ 6 = -3.72036e-08$$
$$A\ 8 = -1.08800e-09\ A10 = 1.03970e-11\ A12 = -1.91023e-14$$

26th Surface $$K = 0.00000e+00\ A\ 4 = 1.66615e-04\ A\ 6 = -1.90317e-06$$
$$A\ 8 = 1.23230e-08\ A10 = -9.41453e-11\ A12 = 4.39584e-13$$

27th Surface $$K = 0.00000e+00\ A\ 4 = 1.69532e-04\ A\ 6 = -1.38711e-06$$
$$A\ 8 = 4.53596e-09\ A10 = -6.87436e-12\ A12 = 2.41668e-14$$

| VARIOUS DATA ZOOM RATIO 1.88 | | | |
|---|---|---|---|
| | WIDE | MIDDLE | TELE |
| Focal Length | 10.33 | 15.00 | 19.39 |
| Fno | 4.08 | 4.08 | 4.12 |
| Half Angle of View (°) | 61.36 | 55.26 | 48.13 |
| Image Height | 18.92 | 21.64 | 21.64 |
| Overall Lens Length | 128.82 | 122.35 | 123.27 |
| BF | 12.13 | 12.13 | 12.13 |
| d 9 | 24.06 | 9.31 | 2.42 |
| d10 | 3.18 | 3.92 | 3.78 |
| d12 | 4.97 | 4.23 | 4.37 |
| d27 | 3.36 | 11.64 | 19.44 |
| d29 | 12.13 | 12.13 | 12.13 |

| LENS UNIT DATA | | |
|---|---|---|
| Lens Unit | Starting Surface | Focal Length |
| 1 | 1 | −19.37 |
| 2 | 11 | 73.58 |
| 3 | 13 | 49.46 |
| 4 | 28 | 71.72 |

Numerical Example 2

UNIT: mm

| SURFACE DATA | | | | |
|---|---|---|---|---|
| Surface No. | r | d | nd | vd |
| 1* | 36.964 | 2.00 | 1.76450 | 49.1 |
| 2* | 17.381 | 12.97 | | |
| 3 | 38.540 | 1.00 | 1.83400 | 37.2 |
| 4 | 17.838 | 8.18 | | |
| 5 | 35.542 | 1.00 | 1.49700 | 81.5 |
| 6 | 17.493 | 9.44 | | |
| 7 | −32.408 | 0.80 | 1.43875 | 94.7 |
| 8 | 29.388 | 4.33 | 1.88300 | 40.8 |
| 9 | −153.902 | (Variable) | | |
| 10 (SP) | ∞ | (Variable) | | |
| 11 | 60.063 | 1.50 | 1.77047 | 29.7 |
| 12 | 4073.289 | (Variable) | | |
| 13 | 24.469 | 0.50 | 1.80810 | 22.8 |
| 14 | 10.086 | 6.29 | 1.80610 | 33.3 |
| 15 | 65.185 | 0.67 | | |
| 16 | −92.079 | 0.50 | 2.00100 | 29.1 |
| 17 | 10.799 | 3.89 | 1.86966 | 20.0 |
| 18 | 60.938 | 0.10 | | |
| 19 | 18.584 | 4.65 | 1.43875 | 94.7 |
| 20* | −29.965 | 0.10 | | |
| 21 | 16.998 | 0.50 | 2.05090 | 26.9 |
| 22 | 11.071 | 6.27 | 1.43875 | 94.7 |
| 23 | −72.227 | 4.03 | | |
| 24 | 21.999 | 0.90 | 1.88300 | 40.8 |
| 25 | 16.878 | 5.45 | | |
| 26* | −21.844 | 1.20 | 1.85400 | 40.4 |
| 27* | −29.304 | (Variable) | | |
| 28 | −242.542 | 7.32 | 1.49700 | 81.5 |
| 29 | −31.336 | (Variable) | | |
| Image Plane | ∞ | | | |

Aspheric Data

1st Surface $$K = 0.00000e+00\ A4 = -5.05120e-07\ A6 = -2.59180e-08$$
$$A8 = 5.64585e-11\ A10 = -6.28825e-14\ A12 = 3.59492e-17$$
$$A14 = -8.73398e-21$$

2nd Surface $$K = -8.50179e-01\ A4 = 6.50619e-06\ A6 = -3.67327e-08$$
$$A8 = -4.18782e-11\ A10 = 3.45919e-13\ A12 = -5.82222e-16$$
$$A14 = 3.42039e-19$$

20th Surface $$K = 0.00000e+00\ A4 = 1.88217e-05\ A6 = -1.07644e-07$$
$$A8 = -8.81979e-10\ A10 = 3.51547e-12\ A12 = 2.13797e-14$$

26th Surface $$K = 0.00000e+00\ A4 = 1.99287e-04\ A6 = -1.86752e-06$$
$$A8 = 9.76715e-09\ A10 = -7.11283e-11\ A12 = 4.03250e-13$$

27th Surface $$K = 0.00000e+00\ A4 = 2.02967e-04\ A6 = -1.31168e-06$$
$$A8 = 1.15301e-09\ A10 = 2.03422e-11\ A12 = -3.00629e-14$$

VARIOUS DATA
ZOOM RATIO 1.94

| | WIDE | MIDDLE | TELE |
|---|---|---|---|
| Focal Length | 9.20 | 16.04 | 17.90 |
| Fno | 4.08 | 4.08 | 4.12 |
| Half Angle of View (°) | 64.04 | 53.45 | 50.40 |
| Image Height | 18.90 | 21.64 | 21.64 |
| Overall Lens Length | 125.26 | 118.57 | 119.35 |
| BF | 10.50 | 10.50 | 10.50 |
| d 9 | 24.00 | 4.83 | 2.21 |
| d10 | 2.10 | 3.01 | 3.07 |
| d12 | 4.14 | 3.23 | 3.17 |
| d27 | 0.93 | 13.41 | 16.81 |
| d29 | 10.50 | 10.50 | 10.50 |

LENS UNIT DATA

| Lens Unit | Starting Surface | Focal Length |
|---|---|---|
| 1 | 1 | −17.03 |
| 2 | 11 | 79.11 |
| 3 | 13 | 42.64 |
| 4 | 28 | 71.58 |

Numerical Example 3

UNIT: mm

SURFACE DATA

| Surface No. | r | d | nd | vd |
|---|---|---|---|---|
| 1* | 34.540 | 2.00 | 1.76450 | 49.1 |
| 2* | 17.538 | 12.00 | | |
| 3 | 27.845 | 1.00 | 2.05090 | 26.9 |
| 4 | 17.335 | 12.15 | | |
| 5 | −102.534 | 1.00 | 1.49700 | 81.5 |
| 6 | 24.557 | 4.63 | | |
| 7 | −163.874 | 1.40 | 1.83400 | 37.2 |
| 8 | −79.091 | 0.80 | 1.43875 | 94.7 |
| 9 | 23.675 | 5.93 | 1.88300 | 40.8 |
| 10 | 685.207 | (Variable) | | |
| 11 (SP) | ∞ | (Variable) | | |
| 12 | 73.782 | 1.50 | 1.85025 | 30.1 |
| 13 | −353.985 | (Variable) | | |
| 14 | 22.242 | 0.50 | 1.96300 | 24.1 |
| 15 | 10.175 | 6.30 | 1.88300 | 40.8 |
| 16 | 40.767 | 0.92 | | |
| 17 | −465.076 | 0.50 | 1.91082 | 35.2 |
| 18 | 10.734 | 4.46 | 1.86966 | 20.0 |
| 19 | 30.913 | 0.10 | | |
| 20 | 17.320 | 4.70 | 1.43875 | 94.7 |
| 21* | −61.628 | 0.10 | | |
| 22 | 17.378 | 0.50 | 2.05090 | 26.9 |
| 23 | 11.257 | 7.57 | 1.43875 | 94.7 |
| 24 | −32.482 | 1.49 | | |
| 25 | 27.690 | 0.90 | 1.88300 | 40.8 |
| 26 | 20.124 | 5.98 | | |
| 27* | −29.240 | 1.20 | 1.85400 | 40.4 |
| 28* | −43.741 | (Variable) | | |
| 29 | −130.532 | 6.39 | 1.49700 | 81.5 |
| 30 | −34.115 | (Variable) | | |
| Image Plane | ∞ | | | |

Aspheric Data

1st Surface $$K = 0.00000e+00\ A4 = -5.58771e-07\ A6 = -1.77995e-08$$
$$A8 = 4.41109e-11\ A10 = -6.23317e-14\ A12 = 4.47696e-17$$
$$A14 = -1.40227e-20$$

2nd Surface $$K = -8.15972e-01\ A4 = 8.81718e-06\ A6 = -1.49702e-08$$
$$A8 = -1.54936e-11\ A10 = 2.29531e-13\ A12 = -5.29361e-16$$
$$A14 = 3.75849e-19$$

21st Surface $$K = 0.00000e+00\ A4 = 1.85120e-05\ A6 = -1.09055e-07$$
$$A8 = 4.00606e-10\ A10 = -1.62869e-11\ A12 = 9.72903e-14$$

27th Surface $$K = 0.00000e+00\ A4 = 3.73139e-05\ A6 = -5.43373e-07$$
$$A8 = 2.13025e-09\ A10 = -2.57230e-11\ A12 = 1.92965e-13$$

28th Surface $$K = 0.00000e+00 \ A4 = 5.07750e-05 \ A6 = -4.00620e-07$$

$$A8 = 1.66532e-10 \ A10 = 4.59683e-12 \ A12 = 8.96647e-15$$

| | VARIOUS DATA ZOOM RATIO 2.12 | | |
|---|---|---|---|
| | WIDE | MIDDLE | TELE |
| Focal Length | 11.30 | 16.61 | 23.90 |
| Fno | 4.08 | 4.08 | 4.12 |
| Half Angle of View (°) | 59.29 | 52.49 | 42.15 |
| Image Height | 19.02 | 21.64 | 21.64 |
| Overall Lens Length | 129.79 | 125.70 | 129.33 |
| BF | 14.54 | 12.80 | 10.54 |
| d10 | 24.00 | 10.61 | 2.20 |
| d11 | 2.10 | 2.30 | 2.09 |
| d13 | 3.77 | 3.57 | 3.78 |
| d28 | 1.36 | 12.39 | 26.70 |
| d30 | 14.54 | 12.80 | 10.54 |

LENS UNIT DATA

| Lens Unit | Starting Surface | Focal Length |
|---|---|---|
| 1 | 1 | −19.47 |
| 2 | 12 | 71.93 |
| 3 | 14 | 53.25 |
| 4 | 29 | 90.93 |

Numerical Example 4

UNIT: mm

SURFACE DATA

| Surface No. | r | d | nd | vd |
|---|---|---|---|---|
| 1* | 35.655 | 2.00 | 1.55332 | 71.7 |
| 2* | 18.553 | 10.14 | | |
| 3 | 43.354 | 1.00 | 1.96300 | 24.1 |
| 4 | 18.994 | 9.15 | | |
| 5 | 54.034 | 1.00 | 1.59270 | 35.3 |
| 6 | 26.677 | 8.97 | | |
| 7 | −33.675 | 0.80 | 1.49700 | 81.5 |
| 8 | 35.482 | 6.14 | 1.85883 | 30.0 |
| 9 | −84.554 | (Variable) | | |
| 10 (SP) | ∞ | (Variable) | | |
| 11 | 123.998 | 1.70 | 1.85025 | 30.1 |
| 12 | −234.488 | (Variable) | | |
| 13* | 26.749 | 1.00 | 1.80810 | 22.8 |
| 14 | 13.432 | 7.73 | 1.80610 | 40.7 |
| 15 | 83.403 | 0.67 | | |
| 16 | 495.726 | 0.50 | 2.00100 | 29.1 |
| 17 | 13.374 | 4.37 | 1.94594 | 18.0 |
| 18 | 28.803 | 0.10 | | |
| 19 | 18.829 | 6.49 | 1.43875 | 94.7 |
| 20* | −34.371 | 0.10 | | |
| 21 | 16.112 | 0.50 | 2.05090 | 26.9 |
| 22 | 11.216 | 8.27 | 1.43875 | 94.7 |
| 23 | 373.115 | (Variable) | | |
| 24 | 31.589 | 0.90 | 1.88300 | 40.8 |
| 25 | 20.666 | 4.64 | | |
| 26* | −27.639 | 1.20 | 1.80400 | 46.5 |
| 27* | −31.668 | (Variable) | | |
| 28 | −110.630 | 1.00 | 1.80610 | 33.3 |
| 29 | −432.539 | 6.50 | 1.59282 | 68.6 |

-continued

SURFACE DATA

| Surface No. | r | d | nd | vd |
|---|---|---|---|---|
| 30 | −34.154 | (Variable) | | |
| Image Plane | ∞ | | | |

Aspheric Data

1st Surface $$K = 0.00000e+00 \ A4 = 8.84489e-07 \ A6 = -1.74958e-08$$

$$A8 = 4.77183e-11 \ A10 = -6.77556e-14 \ A12 = 5.30183e-17$$

$$A14 = -1.85401e-20$$

2nd Surface $$K = -9.16996e-01 \ A4 = 9.24051e-06 \ A6 = -2.08874e-08$$

$$A8 = 6.43752e-11 \ A10 = -1.33742e-13 \ A12 = 3.25127e-16$$

$$A14 = -3.48263e-19$$

13th Surface $$K = 0.00000e+00 \ A4 = -3.08173e-06 \ A6 = -9.07213e-09$$

$$A8 = 3.76703e-11 \ A10 = -9.38527e-14$$

20th Surface $$K = 0.00000e+00 \ A4 = 1.39904e-05 \ A6 = 6.25811e-09$$

$$A8 = -8.77158e-10 \ A10 = 1.49936e-11 \ A12 = -6.74357e-14$$

26th Surface $$K = 0.00000e+00 \ A4 = 1.02392e-04 \ A6 = -1.86870e-07$$

$$A8 = -5.03914e-09 \ A10 = 3.67314e-11 \ A12 = -3.01596e-14$$

27th Surface $$K = 0.00000e+00 \ A4 = 1.16632e-04 \ A6 = -1.10396e-08$$

$$A8 = -7.02472e-09 \ A10 = 5.73923e-11 \ A12 = -1.51353e-13$$

| | VARIOUS DATA ZOOM RATIO 1.95 | | |
|---|---|---|---|
| | WIDE | MIDDLE | TELE |
| Focal Length | 11.30 | 14.97 | 22.00 |
| Fno | 2.89 | 2.89 | 2.89 |
| Half Angle of View (°) | 59.44 | 55.32 | 44.52 |
| Image Height | 19.14 | 21.64 | 21.64 |
| Overall Lens Length | 137.35 | 129.65 | 125.58 |

-continued

| | VARIOUS DATA ZOOM RATIO 1.95 | | |
|---|---|---|---|
| | WIDE | MIDDLE | TELE |
| BF | 13.50 | 12.41 | 10.50 |
| d 9 | 29.39 | 16.54 | 3.44 |
| d10 | 2.10 | 2.10 | 2.53 |
| d12 | 4.88 | 4.88 | 4.45 |
| d23 | 1.00 | 2.19 | 4.27 |
| d27 | 1.61 | 6.66 | 15.52 |
| d30 | 13.50 | 12.41 | 10.50 |

| LENS UNIT DATA | | |
|---|---|---|
| Lens Unit | Starting Surface | Focal Length |
| 1 | 1 | −20.99 |
| 2 | 11 | 95.60 |
| 3 | 13 | 33.35 |
| 4 | 24 | −57.66 |
| 5 | 28 | 89.95 |

Numerical Example 5

UNIT: mm

| SURFACE DATA | | | | |
|---|---|---|---|---|
| Surface No. | r | d | nd | νd |
| 1* | 36.363 | 1.60 | 1.76450 | 49.1 |
| 2* | 15.487 | 6.54 | | |
| 3 | 27.280 | 1.00 | 2.05090 | 26.9 |
| 4 | 18.536 | 6.70 | | |
| 5 | 32.793 | 1.00 | 1.49700 | 81.5 |
| 6 | 17.362 | 10.47 | | |
| 7 | −34.260 | 0.80 | 1.43875 | 94.7 |
| 8 | 34.586 | 3.94 | 1.90525 | 35.0 |
| 9 | −201.854 | (Variable) | | |
| 10 (SP) | ∞ | (Variable) | | |
| 11 | 51.209 | 1.50 | 1.67300 | 38.3 |
| 12 | −111.251 | (Variable) | | |
| 13 | −61.646 | 0.80 | 2.00100 | 29.1 |
| 14 | −204.214 | (Variable) | | |
| 15 | 19.146 | 0.50 | 2.05090 | 26.9 |
| 16 | 10.112 | 4.75 | 1.80610 | 40.7 |
| 17 | 152.402 | 0.35 | | |
| 18 | −367.791 | 0.50 | 1.91082 | 35.2 |
| 19 | 11.324 | 2.84 | 1.89286 | 20.4 |
| 20 | 31.987 | 0.10 | | |
| 21 | 17.704 | 4.27 | 1.43875 | 94.7 |
| 22* | −54.171 | 0.10 | | |
| 23 | 18.960 | 0.50 | 2.05090 | 26.9 |
| 24 | 11.500 | 8.01 | 1.43875 | 94.7 |
| 25 | −21.312 | 0.49 | | |
| 26 | 21.333 | 1.00 | 1.83481 | 42.7 |
| 27 | 16.304 | (Variable) | | |
| 28* | −24.186 | 1.20 | 1.85400 | 40.4 |
| 29* | 41.948 | (Variable) | | |
| Image Plane | ∞ | | | |

Aspheric Data 1 st Surface $$K = 0.00000e+00 \quad A4 = -7.44158e-06 \quad A6 = 2.17599e-08$$

$$A8 = -4.81867e-11 \quad A10 = 6.22617e-14 \quad A12 = -4.40517e-17$$

$$A14 = 1.19690e-20$$

2nd Surface $$K = -8.72295e-01 \quad A4 = 5.42531e-07 \quad A6 = 9.78315e-09$$

$$A8 = 1.72802e-10 \quad A10 = -9.18661e-13 \quad A12 = 2.12915e-15$$

$$A14 = -1.99953e-18$$

22nd Surface $$K = 0.000000e+00 \quad A4 = 3.62847e-05 \quad A6 = -2.63477e-07$$

$$A8 = 1.92638e-09 \quad A10 = -6.70834e-11 \quad A12 = 4.52971e-13$$

28th Surface $$K = 0.00000e+00 \quad A4 = 1.17855e-04 \quad A6 = -1.63605e-06$$

$$A8 = 9.00680e-09 \quad A10 = -6.51152e-11 \quad A12 = 3.38027e-13$$

29th Surface $$K = 0.00000e+00 \quad A4 = 1.30738e-04 \quad A6 = -1.32589e-06 \quad A8 = 4.36587e-09$$

$$A10 = -2.34452e-12 \quad A12 = 1.29797e-14$$

| | VARIOUS DATA ZOOM RATIO 1.90 | | |
|---|---|---|---|
| | WIDE | MIDDLE | TELE |
| Focal Length | 10.30 | 16.00 | 19.60 |
| Fno | 4.08 | 4.08 | 4.12 |
| Half Angle of View (°) | 61.86 | 53.52 | 47.83 |
| Image Height | 19.26 | 21.64 | 21.64 |
| Overall Lens Length | 114.35 | 105.41 | 104.44 |
| BF | 14.75 | 21.84 | 26.22 |
| d 9 | 24.50 | 7.84 | 2.10 |
| d10 | 2.10 | 2.82 | 3.40 |
| d12 | 3.35 | 3.32 | 3.17 |
| d14 | 2.03 | 1.34 | 0.91 |
| d27 | 8.66 | 9.29 | 9.68 |
| d29 | 14.75 | 21.84 | 26.22 |

| LENS UNIT DATA | | |
|---|---|---|
| Lens Unit | Starting Surface | Focal Length |
| 1 | 1 | −18.06 |
| 2 | 11 | 52.30 |
| 3 | 13 | −88.46 |
| 4 | 15 | 27.53 |
| 5 | 28 | −69.03 |

Numerical Example 6

UNIT: mm

| SURFACE DATA | | | | |
|---|---|---|---|---|
| Surface No. | r | d | nd | vd |
| 1* | 36.245 | 2.00 | 1.76450 | 49.1 |
| 2* | 18.260 | 13.76 | | |
| 3 | 36.879 | 1.00 | 1.95375 | 32.3 |
| 4 | 18.000 | 10.79 | | |
| 5 | 53.599 | 1.00 | 1.49700 | 81.5 |
| 6 | 21.569 | 8.03 | | |
| 7 | −31.559 | 0.80 | 1.43875 | 94.7 |
| 8 | 31.309 | 4.96 | 1.88300 | 40.8 |
| 9 | −94.449 | (Variable) | | |
| 10 (SP) | ∞ | (Variable) | | |
| 11 | 53.950 | 1.50 | 1.66565 | 35.6 |
| 12 | −175.277 | (Variable) | | |
| 13 | 268.814 | 0.80 | 1.61772 | 49.8 |
| 14 | 56.472 | (Variable) | | |
| 15 | 22.881 | 0.50 | 1.96300 | 24.1 |
| 16 | 10.376 | 5.45 | 1.90043 | 37.4 |
| 17 | 94.514 | 0.58 | | |
| 18 | −137.963 | 0.50 | 1.95375 | 32.3 |
| 19 | 10.860 | 3.42 | 1.86966 | 20.0 |
| 20 | 34.673 | 0.10 | | |
| 21 | 17.287 | 5.79 | 1.43875 | 94.7 |
| 22* | −61.411 | 0.10 | | |
| 23 | 16.219 | 0.50 | 2.05090 | 26.9 |
| 24 | 11.080 | 8.94 | 1.43875 | 94.7 |
| 25 | −31.009 | 0.50 | | |
| 26 | 20.448 | 1.00 | 1.83481 | 42.7 |
| 27 | 15.800 | (Variable) | | |
| 28* | −15.305 | 1.20 | 1.85400 | 40.4 |
| 29* | −22.734 | (Variable) | | |
| 30 | −116.151 | 6.84 | 1.49700 | 81.5 |
| 31 | −29.679 | (Variable) | | |
| Image Plane | ∞ | | | |

Aspheric Data

1st Surface $K=0.00000e+00\ A4=3.92202e-08\ A6=-2.69648e-08\ A8=6.09684e-11$ $A10=-7.05373e-14\ A12=4.15238e-17\ A14=-1.05285e-20$ 2nd Surface $K=-8.62038e-01\ A4=8.10669e-06\ A6=-3.15674e-08\ A8=-3.37489e-11$ $A10=3.31967e-13\ A12=-5.81678e-16\ A14=3.32304e-19$ 22nd Surface $K=0.00000e+00\ A4=2.23580e-05\ A6=-1.43420e-07\ A8-1.13126e-09$ $A10=-2.96786e-11\ A12=1.87767e-13$ 28th Surface $K=0.00000e+00\ A4=1.89068e-04\ A6=-1.82499e-06\ A8=8.70129e-09$ $A10=-5.29084e-11\ A12=3.77732e-13$ 29th Surface $K=0.00000e+00\ A4=1.81235e-04\ A6=-1.41031e-06\ A8=3.38789e-09$ $A10=1.58728e-11\ A12=-5.28155e-14$

| | VARIOUS DATA ZOOM RATIO 1.92 | | |
|---|---|---|---|
| | WIDE | MIDDLE | TELE |
| Focal Length | 10.30 | 15.22 | 19.80 |
| Fno | 2.89 | 3.50 | 4.12 |
| Half Angle of View (°) | 61.76 | 54.87 | 47.54 |
| Image Height | 19.18 | 21.64 | 21.64 |
| Overall Lens Length | 132.94 | 126.11 | 127.01 |
| BF | 11.35 | 11.35 | 11.35 |
| d 9 | 24.44 | 9.22 | 2.28 |
| d10 | 2.17 | 2.34 | 2.10 |
| d12 | 3.85 | 4.20 | 4.93 |
| d14 | 2.01 | 1.49 | 1.00 |
| d27 | 7.87 | 7.76 | 7.66 |
| d29 | 1.19 | 9.69 | 17.64 |
| d31 | 11.35 | 11.35 | 11.35 |

| LENS UNIT DATA | | |
|---|---|---|
| Lens Unit | Starting Surface | Focal Length |
| 1 | 1 | −19.36 |
| 2 | 11 | 62.14 |
| 3 | 13 | −115.90 |
| 4 | 15 | 30.94 |
| 5 | 28 | −59.25 |
| 6 | 30 | 78.16 |

Numerical Example 7

UNIT: mm

| SURFACE DATA | | | | |
|---|---|---|---|---|
| Surface No. | r | d | nd | vd |
| 1* | 40.468 | 3.00 | 1.58313 | 59.4 |
| 2* | 18.279 | 10.33 | | |
| 3 | 41.125 | 1.23 | 1.91082 | 35.2 |
| 4 | 18.235 | 7.50 | | |
| 5 | 34.985 | 1.15 | 1.59282 | 68.6 |
| 6 | 18.756 | 9.56 | | |
| 7 | −34.618 | 1.10 | 1.43875 | 94.7 |
| 8 | 29.346 | 5.41 | 1.88300 | 40.8 |
| 9 | −90.407 | (Variable) | | |
| 10 | −56.739 | 1.00 | 1.76385 | 48.5 |
| 11 | −112.660 | (Variable) | | |
| 12 (SP) | ∞ | (Variable) | | |

-continued

| SURFACE DATA | | | | |
|---|---|---|---|---|
| Surface No. | r | d | nd | νd |
| 13 | 63.090 | 1.59 | 1.72047 | 34.7 |
| 14 | −227.320 | (Variable) | | |
| 15 | 21.699 | 0.69 | 1.80810 | 22.8 |
| 16 | 10.106 | 5.14 | 1.67300 | 38.3 |
| 17 | 121.574 | 0.70 | | |
| 18 | −51.133 | 0.55 | 1.88300 | 40.8 |
| 19 | 13.133 | 2.71 | 1.92286 | 20.9 |
| 20 | 38.530 | 0.35 | | |
| 21 | 19.973 | 5.25 | 1.49700 | 81.5 |
| 22* | −31.304 | 0.15 | | |
| 23 | 18.415 | 0.64 | 2.05090 | 26.9 |
| 24 | 11.103 | 8.58 | 1.49700 | 81.5 |
| 25 | −41.834 | 0.35 | | |
| 26 | 22.000 | 0.90 | 1.88300 | 40.8 |
| 27 | 16.493 | 5.28 | | |
| 28* | −23.968 | 1.90 | 1.85400 | 40.4 |
| 29* | −43.861 | (Variable) | | |
| 30 | −345.096 | 6.53 | 1.49700 | 81.5 |
| 31 | −35.363 | (Variable) | | |
| Image Plane | ∞ | | | |

Aspheric Data

1st Surface $K = 0.00000e+00$ $A4 = 9.61528e-06$ $A6 = -3.60704e-08$ $A8 = 5.97941e-11$ $A10 = -5.54186e-14$ $A12 = 2.90939e-17$ $A14 = -6.66932e-21$ 2nd Surface $K = -1.23054e+00$ $A4 = 2.50795e-05$ $A6 = -3.04254e-08$ $A8 = -9.21626e-11$ $A10 = 3.40025e-13$ $A12 = -3.47266e-16$ $A14 = 9.28758e-20$ 22nd Surface $K = 0.00000e+00$ $A4 = 2.19912e-05$ $A6 = -6.02422e-08$ $A8 = -9.31268e-10$ $A10 = 8.72477e-12$ $A12 = -1.88516e-14$ 28th Surface $K = 0.00000e+00$ $A4 = 1.68018e-04$ $A6 = -1.88198e-06$ $A8 = 1.28345e-08$ $A10 = -9.75590e-11$ $A12 = 4.53596e-13$ 29th Surface $K = 0.00000e+00$ $A4 = 1.65677e-04$ $A6 = -1.34196e-06$ $A8 = 4.55621e-09$ $A10 = -6.90232e-12$ $A12 = 1.71906e-14$

| | VARIOUS DATA ZOOM RATIO 1.88 | | |
|---|---|---|---|
| | WIDE | MIDDLE | TELE |
| Focal Length | 10.33 | 15.00 | 19.39 |
| Fno | 4.08 | 4.08 | 4.12 |
| Half Angle of View (°) | 61.35 | 55.27 | 48.13 |
| Image Height | 18.90 | 21.64 | 21.64 |
| Overall Lens Length | 128.34 | 123.04 | 124.10 |
| BF | 12.36 | 12.36 | 12.36 |
| d 9 | 3.98 | 2.86 | 1.10 |
| d11 | 18.86 | 6.19 | 1.20 |
| d12 | 3.18 | 4.32 | 4.18 |
| d14 | 4.50 | 3.36 | 3.50 |
| d29 | 3.86 | 12.35 | 20.15 |
| d31 | 12.36 | 12.36 | 12.36 |

| LENS UNIT DATA | | |
|---|---|---|
| Lens Unit | Starting Surface | Focal Length |
| 1 | 1 | −24.89 |
| 2 | 10 | −150.81 |
| 3 | 13 | 68.70 |
| 4 | 15 | 47.71 |
| 5 | 30 | 78.73 |

Table 1 below summarizes various values of inequalities (1) to (13) in each numerical example.

TABLE 1

| | Numerical Example | | | | | | |
|---|---|---|---|---|---|---|---|
| | Ex. 1 | Ex. 2 | Ex. 3 | Ex. 4 | Ex. 5 | Ex. 6 | Ex. 7 |
| TLw | 128.82 | 125.26 | 129.79 | 137.35 | 114.35 | 132.94 | 128.34 |
| skw | 12.13 | 10.50 | 14.54 | 13.50 | 14.75 | 11.35 | 12.36 |
| DLFw | 66.31 | 65.82 | 67.01 | 70.69 | 58.65 | 68.95 | 66.30 |
| DSPw | 65.69 | 61.54 | 64.88 | 68.76 | 57.80 | 66.16 | 65.22 |
| DISw | 34.48 | 35.24 | 34.51 | 39.41 | 32.19 | 36.71 | 34.38 |
| fL1 | −19.37 | −17.03 | −19.47 | −20.99 | −18.06 | −19.36 | −24.89 |
| fLF | 73.58 | 79.11 | 71.93 | 95.60 | 52.30 | 62.14 | 68.70 |
| fLIS | −80.07 | −89.49 | −88.34 | −70.40 | −91.09 | −92.30 | −80.82 |
| fLN | 71.72 | 71.58 | 90.93 | 89.95 | −69.03 | 78.16 | 78.73 |
| ndGP | 1.72 | 1.77 | 1.85 | 1.85 | 1.67 | 1.67 | 1.72 |
| ν d GP | 34.71 | 29.74 | 30.05 | 30.05 | 38.26 | 35.64 | 34.71 |
| ν d GIS | 40.81 | 40.81 | 40.81 | 46.53 | 42.74 | 42.74 | 40.81 |

TABLE 1-continued

| | Numerical Example | | | | | | |
|---|---|---|---|---|---|---|---|
| | Ex. 1 | Ex. 2 | Ex. 3 | Ex. 4 | Ex. 5 | Ex. 6 | Ex. 7 |
| ν d G1P | 40.81 | 40.81 | 40.81 | 30.00 | 35.04 | 40.81 | 40.81 |
| R 1 | 22.20 | 22.00 | 27.69 | 31.59 | 21.33 | 20.45 | 22.00 |
| R 2 | 16.58 | 16.88 | 20.12 | 20.67 | 16.30 | 15.80 | 16.49 |
| Ymax_w | 18.92 | 18.90 | 19.02 | 19.14 | 19.26 | 19.18 | 18.90 |
| Dist_w | −12.56 | −12.53 | −11.98 | −11.45 | −10.68 | −11.25 | −12.55 |
| (1) | 0.52 | 0.57 | 0.53 | 0.57 | 0.56 | 0.55 | 0.53 |
| (2) | 34.71 | 29.74 | 30.05 | 30.05 | 38.26 | 35.64 | 34.71 |
| (3) | 0.51 | 0.53 | 0.52 | 0.51 | 0.51 | 0.52 | 0.52 |
| (4) | 0.09 | 0.08 | 0.11 | 0.10 | 0.13 | 0.09 | 0.10 |
| (5) | −0.26 | −0.22 | −0.27 | −0.22 | −0.35 | −0.31 | −0.36 |
| (6) | 0.27 | 0.24 | 0.21 | 0.23 | 0.26 | 0.25 | 0.32 |
| (7) | 0.90 | 0.80 | 1.03 | 1.28 | 0.76 | 0.85 | 0.97 |
| (8) | 1.72 | 1.77 | 1.85 | 1.85 | 1.67 | 1.67 | 1.72 |
| (9) | 40.81 | 40.81 | 40.81 | 46.53 | 42.74 | 42.74 | 40.81 |
| (10) | 40.81 | 40.81 | 40.81 | 30.00 | 35.04 | 40.81 | 40.81 |
| (11) | 6.89 | 7.59 | 6.32 | 4.78 | 7.48 | 7.80 | 6.99 |
| (12) | −0.98 | −1.11 | −0.98 | −0.91 | −1.07 | −0.99 | −0.76 |
| (13) | −12.56 | −12.53 | −11.98 | −11.45 | −10.68 | −11.25 | −12.55 |

Image Pickup Apparatus

Figure 23:
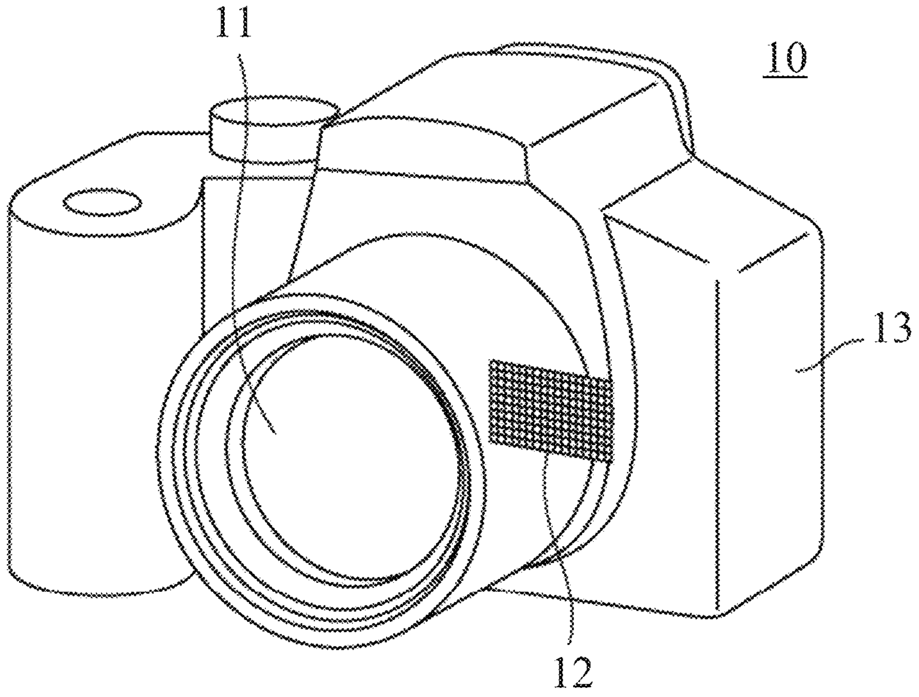
FIG. 23 is a schematic diagram of an image pickup apparatus including the zoom lens according to any according to Examples 1 to 7.

FIG. 23 schematically illustrates an image pickup apparatus (digital still camera) 10 including the zoom lens according to any one of the above examples as an imaging optical system. This image pickup apparatus 10 includes a camera body 13, an imaging optical system 11, and an image sensor 12 configured to photoelectrically convert (capture) an optical image formed by the imaging optical system 11.

The image pickup apparatus 10 includes the imaging optical system 11 having a small size and satisfactory optical performance and thus can obtain a high-quality captured image. In this case, various aberrations such as distortion and chromatic aberration in the captured image may be electrically corrected by an unillustrated image processing unit in the image pickup apparatus 10, and thereby a high-quality image can be output.

The zoom lens L0 according to each example described above is not limited to the digital still camera illustrated in FIG. 23 but is also applicable to various types of optical apparatuses such as a film-based camera, a video camera, and a telescope.

Image Pickup System

An image pickup system (surveillance camera system) may include the zoom lens L0 according to any one of the above examples and a control unit configured to control the zoom lens L0. In this case, the control unit can control the zoom lens L0 so that each lens unit moves as described above during zooming, focusing, and image stabilization. The control unit does not necessarily need to be integrated with the zoom lens L0 but may be separate from the zoom lens L0. For example, the control unit (control apparatus) may be remotely disposed from a driving unit that drives each lens unit of the zoom lens L0, and may include a transmission unit that transfers control signals (commands) for controlling the zoom lens L0. This control unit can remotely operate the zoom lens L0.

Moreover, an operation unit for remotely operating the zoom lens L0, such as a controller or a button may be provided to the control unit and the zoom lens L0 may be controlled in accordance with an input to the operation unit from a user. For example, a scale-up button and a scale-down button may be provided as the operation unit. In this case, a signal may be transferred from the control unit to the driving unit of the zoom lens L0 so that the magnification of the zoom lens L0 increases in a case where the scale-up button is pressed by the user and the magnification of the zoom lens L0 decreases in a case where the scale-down button is pressed by the user.

The image pickup system may include a display unit such as a liquid crystal panel that displays information (moving state) on zoom of the zoom lens L0. The information on zoom of the zoom lens L0 is, for example, zoom magnification (zoom state) and the moving amount (moving state) of each lens unit. In this case, the user can remotely operate the zoom lens L0 through the operation unit while viewing the information on zoom of the zoom lens L0 and displayed on the display unit. The display unit and the operation unit may be integrated using a touch panel or the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a compact and high optical performance zoom lens even during image stabilization and an image pickup apparatus having the same.

This application claims priority to Japanese Patent Application No. 2023-004535, which was filed on Jan. 16, 2023, and which is hereby incorporated by reference herein in its entirety.

What is claimed is:

1. A zoom lens comprising, in order from an object side to an image side:

a first lens unit having negative refractive power; and a rear group including two or more lens units, and an aperture stop, wherein the rear group includes an image stabilizing unit having negative refractive power and configured to move with a component in a direction orthogonal to an optical axis during image stabilization, and a focus unit disposed on the object side of the image stabilizing unit, wherein a distance between adjacent lens units changes during zooming, wherein the image stabilizing unit includes a negative lens having a meniscus shape with a convex surface on the object side, and wherein the following inequalities are satisfied:

$$0.40 \leq DISw/DSPw \leq 0.80$$

$$0.40 \leq (R1+R2)/(R1-R2) \leq 13.0$$

where DSPw is a distance on the optical axis from the aperture stop to an image plane at a wide-angle end, DISw is a distance on the optical axis from the aperture stop to a surface disposed closest to an object in the image stabilizing unit at the wide-angle end, R1 is a radius of curvature of a surface of the negative lens on the object side, and R2 is a radius of curvature of a surface of the negative lens on the image side.

2. The zoom lens according to claim 1, wherein the focus unit includes a positive lens, and the following inequality is satisfied:

$$25 \leq vdGP \leq 45$$

where νdGP is an Abbe number of the positive lens based on d-line.

3. The zoom lens according to claim 1, wherein the following inequality is satisfied:

$$0.48 \leq DLFw/TLw \leq 0.65$$

where TLw is an overall optical length of the zoom lens at the wide-angle end, and DLFw is a distance on the optical axis from a surface disposed closest to the object in the zoom lens to a surface disposed closest to the object in the focus unit.

4. The zoom lens according to claim 1, wherein the following inequality is satisfied:

$$0.04 \leq Skw/TLw \leq 0.25$$

where Skw is a back focus of the zoom lens at the wide-angle end, and TLw is an overall optical length of the zoom lens at the wide-angle end.

5. The zoom lens according to claim 1, wherein the following inequality is satisfied:

$$-0.45 \leq fL1/fLF \leq -0.15$$

where fL1 is a focal length of the first lens unit, and fLF is a focal length of the focus unit.

6. The zoom lens according to claim 1, wherein the following inequality is satisfied:

$$0.00 < |fL1/fLN| \leq 0.40$$

where fL1 is a focal length of the first lens unit, and fLN is a focal length of a lens unit disposed closest to the image plane in the zoom lens.

7. The zoom lens according to claim 1, wherein the following inequality is satisfied:

$$0.50 \leq |fLN/fLIS| \leq 1.60$$

where fLN is a focal length of a lens unit disposed closest to the image plane in the zoom lens, and fLIS is a focal length of the image stabilizing unit.

8. The zoom lens according to claim 1, wherein the focus unit includes a positive lens, and the following inequality is satisfied:

$$1.60 \leq ndGP \leq 1.91$$

where ndGP is a refractive index of the positive lens for d-line.

9. The zoom lens according to claim 1, wherein the image stabilizing unit includes a negative lens, and the following inequality is satisfied:

$$35 \leq vdGIS \leq 60$$

where νdGIS is an Abbe number of the negative lens for d-line.

10. The zoom lens according to claim 1, wherein the first lens unit includes at least one positive lenses, and the following inequality is satisfied:

$$22 \leq vdG1P \leq 50$$

where νdG1P is an Abbe number of a positive lens having strongest refractive power among the at least one positive lenses for d-line.

11. The zoom lens according to claim 1, wherein the following inequality is satisfied:

$$-1.60 \leq \mathrm{Ymax\_w}/fL1 \leq -0.40$$

where Ymax_w is a maximum image height at the wide-angle end in an in-focus state at infinity, and fL1 is a focal length of the first lens unit.

12. The zoom lens according to claim 1, wherein the following inequality is satisfied:

$$-20 \leq \mathrm{Dist\_w} \leq -8.0$$

where Dist_w is a distortion amount at a maximum image height at the wide-angle end in an in-focus state at infinity.

13. The zoom lens according to claim 1, further comprising a memory storing correction data to be used to correct distortion of the zoom lens.

14. The zoom lens according to claim 1, wherein the first lens unit includes four or more negative lenses and at least one positive lens.

15. The zoom lens according to claim 1, wherein the first lens unit moves during zooming.

16. The zoom lens according to claim 1, wherein a lens unit disposed closest to the image plane in the zoom lens includes three or fewer lenses.

17. The zoom lens according to claim 1, wherein a distance between the first lens unit and a second lens unit is maximum among distances between all lens units included in the zoom lens at the wide-angle end.

18. The zoom lens according to claim 1, wherein the rear group includes three or more lens units, distances between which change during zooming.

19. The zoom lens according to claim 1, wherein a lens unit disposed closest to the image plane in the zoom lens is fixed during zooming.

20. The zoom lens according to claim 1, wherein the aperture stop is disposed on the object side of the focus unit.

21. The zoom lens according to claim 1, wherein the two or more lens units included in the rear group include, in order from the object side to the image side:

a second lens unit having positive refractive power;

a third lens unit having positive refractive power; and a fourth lens unit having positive refractive power.

22. The zoom lens according to claim 1, wherein the two or more lens units included in the rear group include, in order from the object side to the image side:

a second lens unit having positive refractive power;

a third lens unit having positive refractive power;

a fourth lens unit having negative refractive power; and a fifth lens unit having positive refractive power.

23. The zoom lens according to claim 1, wherein the two or more lens units included in the rear group include, in order from the object side to the image side:

a second lens unit having positive refractive power;

a third lens unit having negative refractive power;

a fourth lens unit having positive refractive power; and a fifth lens unit having negative refractive power.

24. The zoom lens according to claim 1, wherein the two or more lens units included in the rear group include, in order from the object side to the image side:

a second lens unit having positive refractive power;

a third lens unit having negative refractive power;

a fourth lens unit having positive refractive power;

a fifth lens unit having negative refractive power; and a sixth lens unit having positive refractive power.

25. The zoom lens according to claim 1, wherein the two or more lens units included in the rear group include, in order from the object side to the image side:

a second lens unit having negative refractive power;

a third lens unit having positive refractive power;

a fourth lens unit having positive refractive power; and a fifth lens unit having positive refractive power.

26. An image pickup apparatus comprising:

a zoom lens; and an image sensor configured to receive an optical image formed by the zoom lens, wherein the zoom lens comprising, in order from an object side to an image side:

a first lens unit having negative refractive power; and a rear group including two or more lens units, and an aperture stop, wherein the rear group includes an image stabilizing unit having negative refractive power and configured to move with a component in a direction orthogonal to an optical axis during image stabilization, and a focus unit disposed on the object side of the image stabilizing unit, wherein a distance between adjacent lens units changes during zooming, wherein the image stabilizing unit includes a negative lens having a meniscus shape with a convex surface on the object side, and wherein the following inequalities are satisfied:

$$0.40 \leq DISw/DSPw \leq 0.80$$

$$3.5 \leq (R1+R2)/(R1-R2) \leq 13.0$$

where DSPw is a distance on the optical axis from the aperture stop to an image plane at a wide-angle end, DISw is a distance on the optical axis from the aperture stop to a surface disposed closest to an object in the image stabilizing unit at the wide-angle end, R1 is a radius of curvature of a surface of the negative lens on the object side, and R2 is a radius of curvature of a surface of the negative lens on the image side.

27. The image pickup apparatus according to claim 26, wherein an effective image circle diameter of the image pickup apparatus on the image sensor at the wide-angle end is smaller than that at a telephoto end.

28. The image pickup apparatus according to claim 26, wherein the image sensor moves in a direction orthogonal to the optical axis together with the image stabilizing unit.

29. A zoom lens comprising, in order from an object side to an image side:

a first lens unit having negative refractive power; and a rear group including two or more lens units, and an aperture stop, wherein the rear group includes an image stabilizing unit having negative refractive power and configured to move with a component in a direction orthogonal to an optical axis during image stabilization, and a focus unit disposed on the object side of the image stabilizing unit, wherein the first lens unit includes four or more negative lenses and at least one positive lens, wherein a distance between adjacent lens units changes during zooming, and wherein the following inequality is satisfied:

$$0.40 \leq DISw/DSPw \leq 0.80$$

where DSPw is a distance on the optical axis from the aperture stop to an image plane at a wide-angle end, and DISw is a distance on the optical axis from the aperture stop to a surface disposed closest to an object in the image stabilizing unit at the wide-angle end.

* * * * *